US012437022B1

(12) United States Patent
Gehly et al.

(10) Patent No.: US 12,437,022 B1
(45) Date of Patent: Oct. 7, 2025

(54) DYNAMIC GENERATION OF WORK REQUESTS

(71) Applicant: Skyword Inc., Boston, MA (US)

(72) Inventors: Darryl Gehly, Temple, NH (US); Carolyn Byrne, Rockwood, ME (US); Samuel Gehly, Temple, NH (US); Nathanael Newby-Kew, Medford, MA (US); Anna Nobile, Austin, TX (US); Sonny Sharp, Highland Park, IL (US); Timothy Tresch, Bethal Park, PA (US); Andrew Wheeler, Cohassett, MA (US)

(73) Assignee: Skyword, Inc., Boston, MA (US)

( * ) Notice: Subject to any disclaimer, the term of this patent is extended or adjusted under 35 U.S.C. 154(b) by 0 days.

(21) Appl. No.: 18/664,598

(22) Filed: May 15, 2024

(51) Int. Cl.
*G06F 16/957* (2019.01)
*G06F 16/9538* (2019.01)

(52) U.S. Cl.
CPC ........ *G06F 16/957* (2019.01); *G06F 16/9538* (2019.01)

(58) Field of Classification Search
CPC ............................ G06F 16/957; G06F 16/9538
USPC .......................................................... 707/706
See application file for complete search history.

(56) References Cited

U.S. PATENT DOCUMENTS

| | | | | |
|---|---|---|---|---|
| 2008/0243608 | A1* | 10/2008 | Chatow | G06Q 30/0255 705/14.27 |
| 2009/0063265 | A1* | 3/2009 | Nomula | G06Q 30/02 705/14.66 |
| 2021/0200943 | A1* | 7/2021 | Aviyam | G06F 16/953 |
| 2024/0273306 | A1* | 8/2024 | Somaiya | G06F 40/186 |
| 2024/0303437 | A1* | 9/2024 | Kraus | G06F 40/30 |
| 2024/0330383 | A1* | 10/2024 | Ros | G06F 16/951 |
| 2024/0330579 | A1* | 10/2024 | Saxena | G06F 40/106 |
| 2024/0362903 | A1* | 10/2024 | Palatnik de Sousa | G06V 10/82 |

OTHER PUBLICATIONS

Smith, Shelly, "4 Types of Search Intent," Medium, Oct. 19, 2023, 11 pages, <https://medium.com/@exec.shellybeanllc/4-types-of-search-intent-baec1d2ef564>.

Google Search Central, "Search Engine Optimization (SEO) Starter Guide," SEO Fundamentals, 3 pages, Accessed May 13, 2024, https://developers.google.com/search/docs/fundamentals/seo-starter-guide.

Google Search Central, "In-depth guide to how Google Search works," SEO Fundamentals, 5 pages, Accessed May 13, 2024, https://developers.google.com/search/docs/fundamentals/how-search-works.

(Continued)

*Primary Examiner* — Kuen S Lu
(74) *Attorney, Agent, or Firm* — Banner & Witcoff, Ltd.; Ross Dannenberg

(57) ABSTRACT

Aspects described herein generally relate to improving search engine optimization (SEO) by improving a process for selecting keywords for search engine optimization, constructing work requests based on selected keywords and output from a first and second large learning model (LLM), and selecting potential contributors to draft articles based on the work requests and prior drafting experience. More specifically, aspects provide for faster construction of work requests and selection of potential qualified contributors. Aspects further provide for improved ability to track SEO improvements for selected keywords.

20 Claims, 22 Drawing Sheets

(56) References Cited

OTHER PUBLICATIONS

Google Search Central, "Do you need an SEO?" SEO Fundamentals, 6 pages, Accessed May 13, 2024, https://developers.google.com/search/docs/fundamentals/do-i-need-seo.

Google Search Central, "Google Search Essentials," Documentation, 3 pages, Accessed May 13, 2024, <https://developers.google.com/search/docs/essentials>.

Open AI, "Introduction," 3 pages, Accessed May 13, 2024, <https://platform.openai.com/docs/introduction>.

Open AI, "Text generation models," 9 pages, Accessed May 13, 2024, <https://platform.openai.com/docs/guides/text-generation/chat-completions-api>.

Google Cloud, "Overview of the Gemini API in Vertex AI," 7 pages, Accessed May 13, 2024, <https://cloud.google.com/vertex-ai/generative-ai/docs/multimodal/overview>.

SEMRush Team, "SEMRush Authority Score Explained and How It Works," SEMRush Blog, 16 pages, Jan. 31, 2023, <https://www.semrush.com/blog/semrush-authority-score-explained>.

Handley, Rachel, "What Keywords Are & How to Use Them," SEMRush Blog, 29 pages, Mar. 19, 2024, <https://www.semrush.com/blog/what-are-keywords/>.

Handley, Rachel, What Is Keyword Difficulty? (& How to Measure It), SEMRush Blog, 16 pages, Apr. 18, 2024, <https://www.semrush.com/blog/keyword-difficulty/>.

Byers, Kyle, "SERPs: Search Engine Results Pages Explained," SEMRush Blog, 29 pages, Jan. 2, 2023, <https://www.semrush.com/blog/serp/>.

"Domain Authority," Moz, 5 pages, Accessed May 13, 2024, <https://moz.com/learn/seo/domain-authority>.

"Welcome to Claude," Anthropic, 4 pages, Accessed May 13, 2024, <https://docs.anthropic.com/en/docs/intro-to-claude>.

"ChatGPT," Wikipedia, 19 pages, Accessed May 13, 2024, <https://en.wikipedia.org/wiki/ChatGPT>.

"Search engine optimization," Wikipedia, 8 pages, Accessed May 13, 2024, <https://en.wikipedia.org/wiki/Search_engine_optimization>.

"Large Language Model," Wikipedia, 13 pages, Accessed May 13, 2024, <https://en.wikipedia.org/wiki/Large_language_model>.

\* cited by examiner

Acceleration Search Contributor Keywords deferment, Roth IRA, budgeting, life insurance, retirement planning, calculators, strategies, mutual funds, diversification
retirement age, lifestyle, emergency fund, interest rates, reinvestment, withdrawals, retirement plans, rebalancing
asset allocation, financial advisor, investment portfolio, traditional IRA, contribution limits, estate planning
retirement communities, long term care, social security, Medicare, Medicaid, healthcare expenses, tax planning
Roth conversions, RMDs, estate taxes, capital gains, tax-deferred, tax-exempt, financial freedom
financial independence, withdrawal rate, sustainable, retirement income, frugal living, passive income, side hustle
part-time work, inflation rates, life expectancy, college expenses, home renovations, downsizing, relocation
rental properties, dining out, memberships, cell phone, charitable donations, veterinary care, home improvements
healthcare, deductibles, copays, medicare, medicaid, assisted living, nursing home, home care, retirement community

DYNAMIC GENERATION OF WORK REQUESTS

FIELD

Aspects described herein relate to computers, networking, and software. More specifically, aspects described herein enable faster preparation of work requests and selection of potential qualified vendors to provide improved search engine optimization based on one or more keywords.

BACKGROUND

For modern companies, online marketing and outreach has become a crucial part of advertising to new and existing consumers. One major component of online marketing is search engine optimization ("SEO"), a process by which a company ensures that the company's website and content appear highly ranked in consumer searches on online search engines such as Google, Bing, Yahoo!, and/or others. A high ranking on a search engine results page (SERP) for terms relevant to a company's products, services, and/or authority within a field is crucial for the company because consumers are unlikely to click on links not listed in the top results.

For example, a financial services company which offers retirement accounts and planning wants to ensure that consumers searching for those services are able to quickly locate the company by searching for related terms. In this scenario, a consumer may search terms such as "retirement," "retirement planning," "401k," "IRA," and/or other similar terms. The company must ensure that the company's website appears highly ranked in search results for those terms because consumers are most likely to select a service within the first few results. "Rank" may indicate how soon a website appears on an SERP for a keyword. Rank may be represented as a number, with "1" indicating the first result and the highest rank. Beyond that, consumers are very unlikely to select a service that doesn't appear on the first page of results. To return to the example of a financial services company, ensuring that both new and existing consumers select the company's services for retirement planning requires ensuring that the company's services appear highly ranked for relevant search terms.

A website's rank as displayed on a SERP is partially based on the occurrence of the search term on the website and on the frequency that other websites link to that website. Although a company cannot control whether third parties link to that company's website, the company can add more references to the search term on the company's website or internal links to different pages within the company website. In turn, additional articles and links may result in the company's website being ranked more highly by the search engine's ranking algorithm, and the search engine may display the company's website more highly in the search results for that search term.

However, each step in this process is difficult, time consuming, expensive, and may require coordination between multiple entities within and outside a company. For example, companies often outsource tracking trending terms for a company's products and services, and how the company ranks against related companies in the same industry, to third parties who specialize in SEO research ("SEO analysis firms"). SEO analysis firms may track specific search terms for an industry, perform search rank result comparison for search terms between companies in the same industry, and evaluate related search terms that a company may not be targeting. However, in many situations, an SEO analysis firm's services are limited to providing information about a company's rank in search results for relevant search terms; the SEO analysis firm does not provide services to add content to the company's website to improve the company's rank.

Instead, a company's marketing department and/or other third parties are responsible for drafting new content for the company website based on the results from the SEO analysis firm. In practice, this is a difficult and time intensive step, especially if the marketing department relies on additional third parties or freelancers to build new content. In this case, the marketing department must review the results from the SEO analysis firm, determine which search terms to target improvements on, and either build new content or draft guidelines for freelancers and/or third parties to build new content. Not only is this process time consuming, it is difficult to prepare work requests, keep track of who is responsible for which content and which search term that content is targeting.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may relate to dynamic generation of work requests for search engine optimization (SEO). Work requests may be generated based on a target entity parameter and a selected keyword for SEO, where the keyword may be selected based on a determination that the target entity may be able to rank highly in search engine results pages (SERP) for the keyword. Aspects described herein may further relate to generating work requests based on one or more prompt parameters and the selected keyword. Aspects described herein may further relate to identifying potential human contributors, based on relevant contributor keywords and prior work experience by the contributors, to draft articles based on the work requests, requesting bids on work requests from the potential contributors, and assigning a work request to a contributor.

For example, a computer-implemented method for dynamically generating work requests for search engine optimization (SEO) may comprise receiving a target website parameter, one or more prompt parameters, and configuring a keyword query, wherein a keyword is a term searched by consumers in search engines with one or more keyword query parameters, and a keyword query returns a list of keywords configured with one or more keyword parameters. This method may further comprise displaying, via a user interface, results from the executed keyword query, wherein a result comprises a keyword and a first rank, where the first rank indicates how highly the target website is displayed in a search engine results page for the keyword. This method may further comprise receiving, via the user interface, a selection of a first keyword and constructing, based on the first keyword and one or more of the prompt parameters, a first prompt and a second prompt, wherein a prompt is an input statement for a large language model (LLM). This method may further comprise receiving a first output from a first LLM corresponding to the first prompt, a second output from a second LLM corresponding to the second prompt, constructing a first work request based on the first output and the second output, wherein the first work request is associated with first keyword, and displaying, via the user interface, the first work request and the first keyword.

The method may further comprise receiving, via the user interface, an indication to re-construct the first work request. This method may further comprise receiving a third output from the first LLM, wherein the third output is generated based on re-sending the first prompt to the first LLM and receiving a fourth output from the second LLM, wherein the fourth output is generated based on re-sending the second prompt to the second LLM. This method may further comprise constructing a second work request, associated with the first keyword, based on the third output and fourth output; displaying the second work request and the first keyword via the user interface.

In the method, the first output may further comprise instructions for a contributor to draft an article to improve a rank of the target website on a search engine results page for the first keyword. In the method, the second output may further comprise an outline for an article to improve a rank of the target website on a search engine results page for the first keyword.

The method may further comprise one or more keyword query parameters, wherein keyword parameters may comprise one or more comparison website parameters, indicating a comparison website, a search type parameter; and a search intent parameter, indicating a type of information a consumer intends to learn when searching for a keyword. The method may further comprise displaying a second rank, wherein the second rank indicates how highly a comparison website is displayed in a search engine results page for the keyword, in the results of the keyword query.

The method may further comprise identifying one or more contributor keywords, wherein a contributor keyword indicates a topic associated with the first work request and selecting, based on the one or more contributor keywords, one or more contributors, wherein a contributor is associated with at least one contributor keyword. The method may further comprise sending the first work request to the one or more contributors, receiving one or more bids from the one or more contributors, wherein a bid is associated with a contributor and comprises an offer to draft an article based on the work request, selecting a first bid, and assigning the first work request to a first contributor associated with the first bid.

For example, a computing device may be configured to dynamically generate work requests for SEO, where the computing device comprises one or more processors and memory storing instructions. The instructions, when executed by the one or more processors, may cause the computing device to receive a target website parameter, one or more prompt parameters, and configure a keyword query, wherein a keyword is a term searched by consumers in search engines with one or more keyword query parameters, and a keyword query returns a list of keywords configured with one or more keyword parameters. The instructions, when executed by the one or more processors, may further cause the computing device to display, via a user interface, results from the executed keyword query, wherein a result comprises a keyword and a first rank, where the first rank indicates how highly the target website is displayed in a search engine results page for the keyword. The instructions, when executed by the one or more processors, may further cause the computing device to receive, via the user interface, a selection of a first keyword and constructing, based on the first keyword and one or more of the prompt parameters, a first prompt and a second prompt, wherein a prompt is an input statement for a large language model (LLM). The instructions, when executed by the one or more processors, may further cause the computing device to receive a first output from a first LLM corresponding to the first prompt, a second output from a second LLM corresponding to the second prompt, construct a first work request based on the first output and the second output, wherein the first work request is associated with first keyword; and displaying, via the user interface, the first work request and the first keyword.

For example, the instructions, when executed by the one or more processors, may further cause the computing device to receive, via the user interface, an indication to re-construct the first work request. The instructions, when executed by the one or more processors, may further cause the computing device to receive a third output from the first LLM, wherein the third output is generated based on re-sending the first prompt to the first LLM and receive a fourth output from the second LLM, wherein the fourth output is generated based on re-sending the second prompt to the second LLM. The instructions, when executed by the one or more processors, may further cause the computing device to construct a second work request, associated with the first keyword, based on the third output and fourth output and display the second work request and the first keyword via the user interface.

The instructions, when executed by the one or more processors, may further cause the computing device to construct the first work request wherein the first output may comprise instructions for a contributor to draft an article to improve a rank of the target website on a search engine results page for the first keyword. The instructions, when executed by the one or more processors, may further cause the computing device to construct the first work request wherein the second output may comprise an outline for an article to improve a rank of the target website on a search engine results page for the first keyword.

The instructions, when executed by the one or more processors, may further cause the computing device to receive one or more keyword query parameters, wherein keyword parameters may comprise one or more comparison website parameters, indicating a comparison website, a search type parameter, and a search intent parameter, indicating a type of information a consumer intends to learn when searching for a keyword. The instructions, when executed by the one or more processors, may further cause the computing device to display a second rank, wherein the second rank indicates how highly a comparison website is displayed in a search engine results page for the keyword, in the results of the keyword query.

The instructions, when executed by the one or more processors, may further cause the computing device to identify one or more contributor keywords, wherein a contributor keyword indicates a topic associated with the first work request and selecting, based on the one or more contributor keywords, one or more contributors, wherein a contributor is associated with at least one contributor keyword. The instructions, when executed by the one or more processors, may further cause the computing device to send the first work request to the one or more contributors, receiving one or more bids from the one or more contributors, wherein a bid is associated with a contributor and comprises an offer to draft an article based on the work request, selecting a first bid, and assigning the first work request to a first contributor associated with the first bid.

One or more non-transitory computer-readable media storing instructions that, when executed by one or more processors, may cause a computing device to perform steps comprising: receiving a target website parameter, one or more prompt parameters, and configuring a keyword query, wherein a keyword is a term searched by consumers in search engines with one or more keyword query parameters, and a keyword query returns a list of keywords configured with one or more keyword parameters. The instructions may further comprise displaying, via a user interface, results from the executed keyword query, wherein a result comprises a keyword and a first rank, where the first rank indicates how highly the target website is displayed in a search engine results page for the keyword. The instructions may further comprise receiving, via the user interface, a selection of a first keyword and constructing, based on the first keyword and one or more of the prompt parameters, a first prompt and a second prompt, wherein a prompt is an input statement for a large language model (LLM). The instructions may further comprise receiving a first output from a first LLM corresponding to the first prompt, a second output from a second LLM corresponding to the second prompt, constructing a first work request based on the first output and the second output, wherein the first work request is associated with first keyword, and displaying, via the user interface, the first work request and the first keyword.

The one or more non-transitory computer-readable media storing instructions that, when executed by one or more processors, may cause a computing device to perform steps further comprising receiving, via the user interface, an indication to re-construct the first work request. The instructions may further comprise receiving a third output from the first LLM, wherein the third output is generated based on re-sending the first prompt to the first LLM and receiving a fourth output from the second LLM, wherein the fourth output is generated based on re-sending the second prompt to the second LLM. The instructions may further comprise constructing a second work request, associated with the first keyword, based on the third output and fourth output; displaying the second work request and the first keyword via the user interface.

The one or more non-transitory computer-readable media storing instructions that, when executed by one or more processors, may cause a computing device to perform steps wherein the first output may further comprise instructions for a contributor to draft an article to improve a rank of the target website on a search engine results page for the first keyword. The instructions may further comprise causing a computing device to perform steps wherein the second output may further comprise an outline for an article to improve a rank of the target website on a search engine results page for the first keyword.

The one or more non-transitory computer-readable media storing instructions that, when executed by one or more processors, may cause a computing device to perform steps further comprising one or more keyword query parameters, wherein keyword parameters may comprise one or more comparison website parameters, indicating a comparison website, a search type parameter; and a search intent parameter, indicating a type of information a consumer intends to learn when searching for a keyword. The instructions may further comprise displaying a second rank, wherein the second rank indicates how highly a comparison website is displayed in a search engine results page for the keyword, in the results of the keyword query.

The one or more non-transitory computer-readable media storing instructions that, when executed by one or more processors, may cause a computing device to perform steps further comprising identifying one or more contributor keywords, wherein a contributor keyword indicates a topic associated with the first work request and selecting, based on the one or more contributor keywords, one or more contributors, wherein a contributor is associated with at least one contributor keyword. The instructions may further comprise sending the first work request to the one or more contributors, receiving one or more bids from the one or more contributors, wherein a bid is associated with a contributor and comprises an offer to draft an article based on the work request, selecting a first bid, and assigning the first work request to a first contributor associated with the first bid. The instructions may further comprise identifying, based on one or more articles by the contributor, one or more contributor keywords associated with the one or more articles.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 6 depicts an example of a user interface where a user may further configure parameters related to generating the SEO optimized work request in accordance with one or more illustrative aspects described herein.

FIG. 9 depicts an example of a user interface displaying results of the keyword query in accordance with one or more illustrative aspects described herein.

FIG. 11 depicts an example of a user interface displaying one or more work requests associated with one or more selected keywords in accordance with one or more illustrative aspects described herein.

FIG. 13 depicts an example of a user interface displaying contributor keywords in accordance with one or more illustrative aspects described herein.

FIG. 21 depicts an example of a user interface for manually updating a child URL to optimize SEO performance in accordance with one or more illustrative aspects described herein.

DETAILED DESCRIPTION

In the following description, reference is made to the accompanying drawings, which form a part hereof, and in which is shown by way of illustration in which aspects described herein may be practiced. It is to be understood that other variations may be utilized and structural and functional modifications may be made without departing from the scope of the described aspects. Aspects described herein are capable of other implementations and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1A:
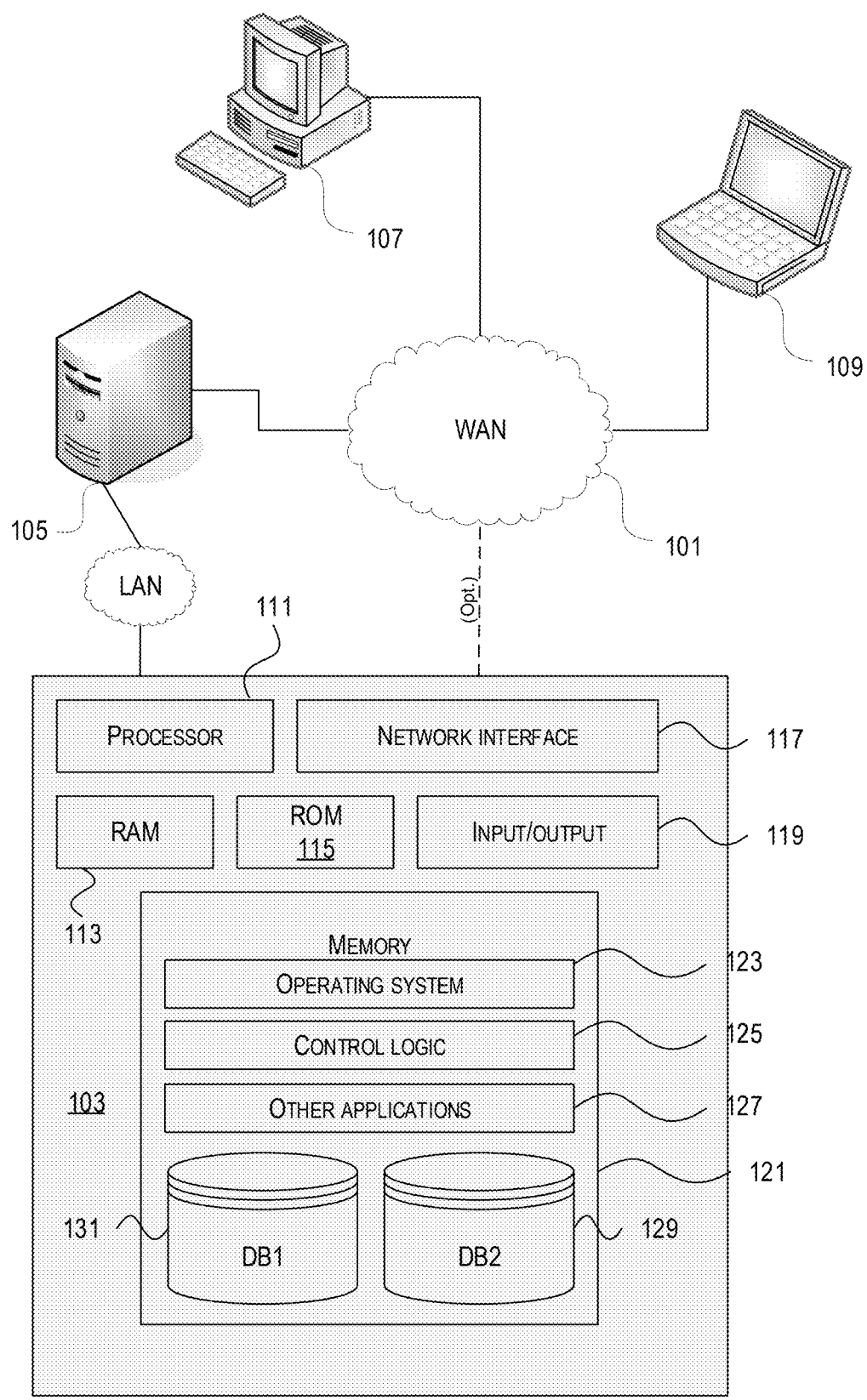
FIG. 1A depicts a computing device that may be used in accordance with one or more illustrative aspects described herein.

FIG. 1A illustrates one example of a network architecture and data processing devices that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 103, second server 105 (e.g., a web server), and computing devices 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Computing devices 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet).

Servers and applications may be combined on the same physical machines, and retain separate virtual or logical addresses, or may reside on separate physical machines. FIG. 1A illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, e.g., laptops, desktops, tablets, smartphones, servers, micro-PCs, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 1B:
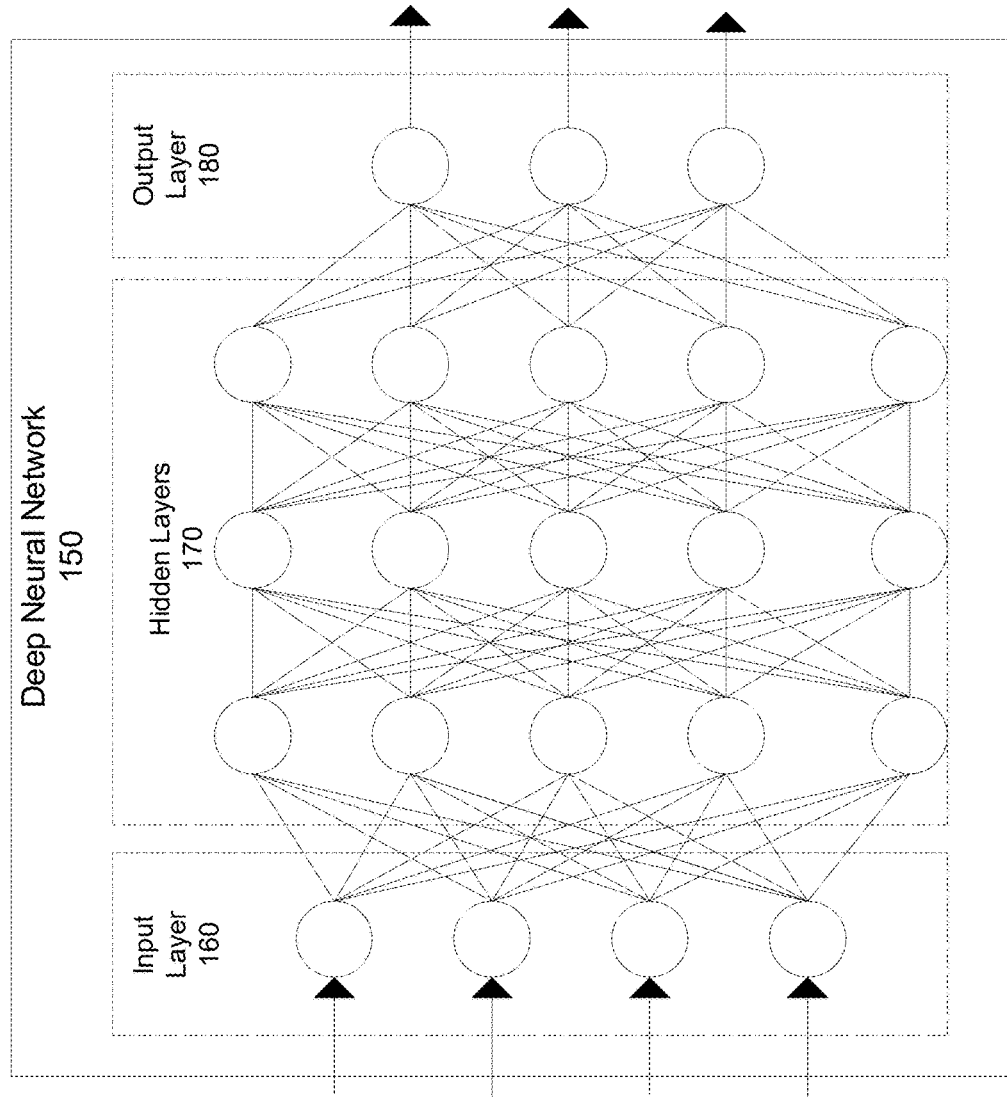
FIG. 1B depicts an example deep neural network architecture for a large language model in accordance with one or more illustrative aspects described herein.

FIG. 1B depicts an example deep neural network architecture for a large language model in accordance with one or more illustrative aspects described herein. A deep neural network architecture 150 may be all or portions of a machine learning software, which may run on computing device 103, 105, 107, 109 as shown in FIG. 1A. That said, the architecture depicted in FIG. 1B need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 160, one or more hidden layers 170, and an output layer 180. A deep neural network, as used herein, may be an artificial network that has more than one hidden layer. Illustrated network architecture 150 is depicted with three hidden layers, and thus may be considered a deep neural network. The number of hidden layers employed in deep neural network architecture 150 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 2:
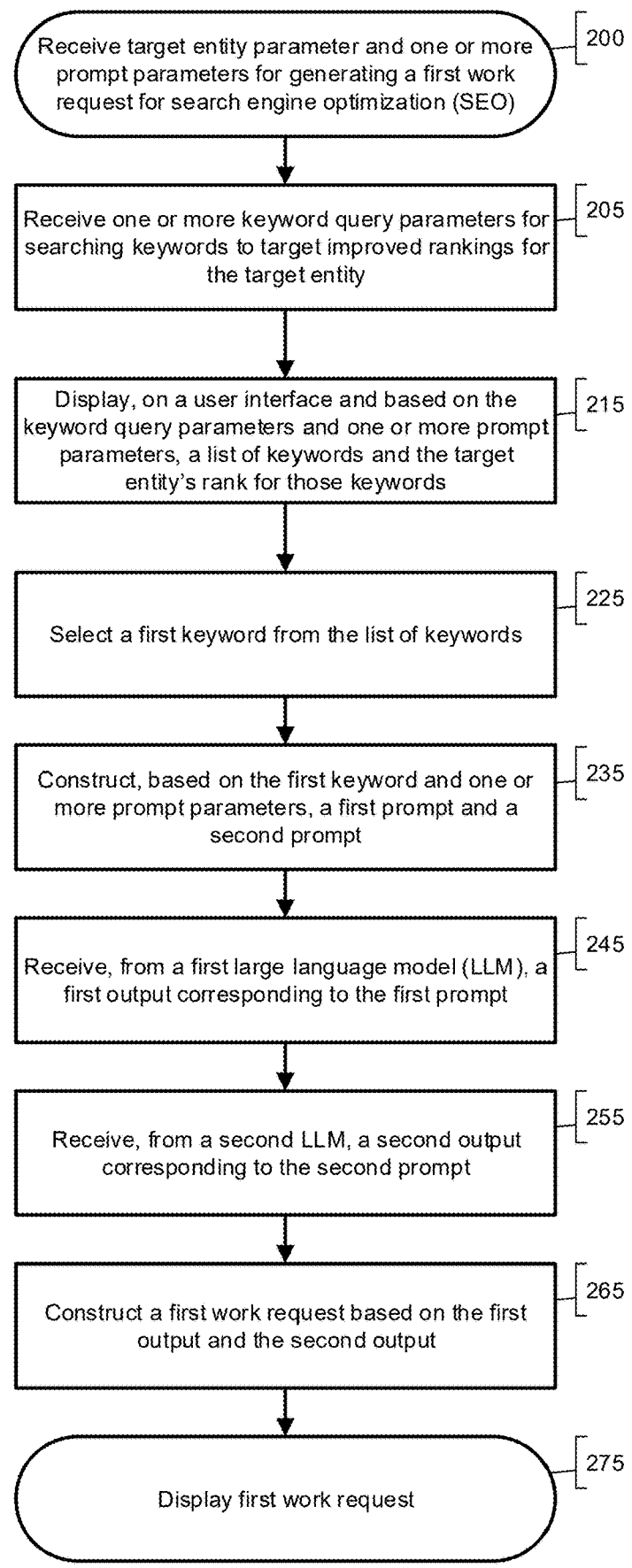
FIG. 2 depicts a flowchart for generating a SEO optimized work request in accordance with one or more illustrative aspects described herein.

A large language model (LLM) may be a type of artificial neural network as shown in FIG. 2. LLMs may be a type of artificial neural network trained on large quantities of text data for the purposes of natural language understanding, natural language processing, and generating natural language outputs. A natural language output from a trained LLM may resemble language written by a human, including, but not limited to: sentences, proper grammar, organization of topics, and/or more.

A user may request output from an LLM in the form of a "prompt," where the prompt may be a natural language input directing the LLM to generate output that is responsive to the prompt. The prompt may comprise specific instructions for the output, such as, but not limited to, limitations on word count, topics to address, style guidelines, and/or additional factors. When an LLM receives a prompt, the LLM may predict, based on the one or more artificial neural networks comprising the LLM, the most likely next word in a response based on the prompt. By predicting the most likely next word, the LLM may construct an output comprising one or more words. The output may be a natural-sounding language response.

Modern LLMs may include proprietary models such as GPT 3.5 and 4.0, Google AI Gemini, LLaMA, Anthropic Claude, and more. Different version numbers, such as between GPT 3.5 and 4.0, may represent differences in training techniques, processing algorithms, training data, and/or other factors. An LLM may be trained to specialize in specific tasks. For example, GPT 4.0 may be configured for more-natural sounding outputs, while Google AI Gemini may be configured for to incorporate live data from one or more websites into the output. A natural language output may be an output from an LLM that may be used for natural language processing, language generation, and/or other purposes.

An LLM may be hosted on a computing device similar to 103 and 105. An LLM may receive prompts from computing devices 103, 105, 107, 109 over network 101 and may return output over network 101 to computing device 103, 105, 107, 109. Computing devices 103, 105 may also receive Application Programming Interface (API) requests over network 101 from computing devices 107, 109, where the API request may comprise a prompt for an LLM.

Figure 3:
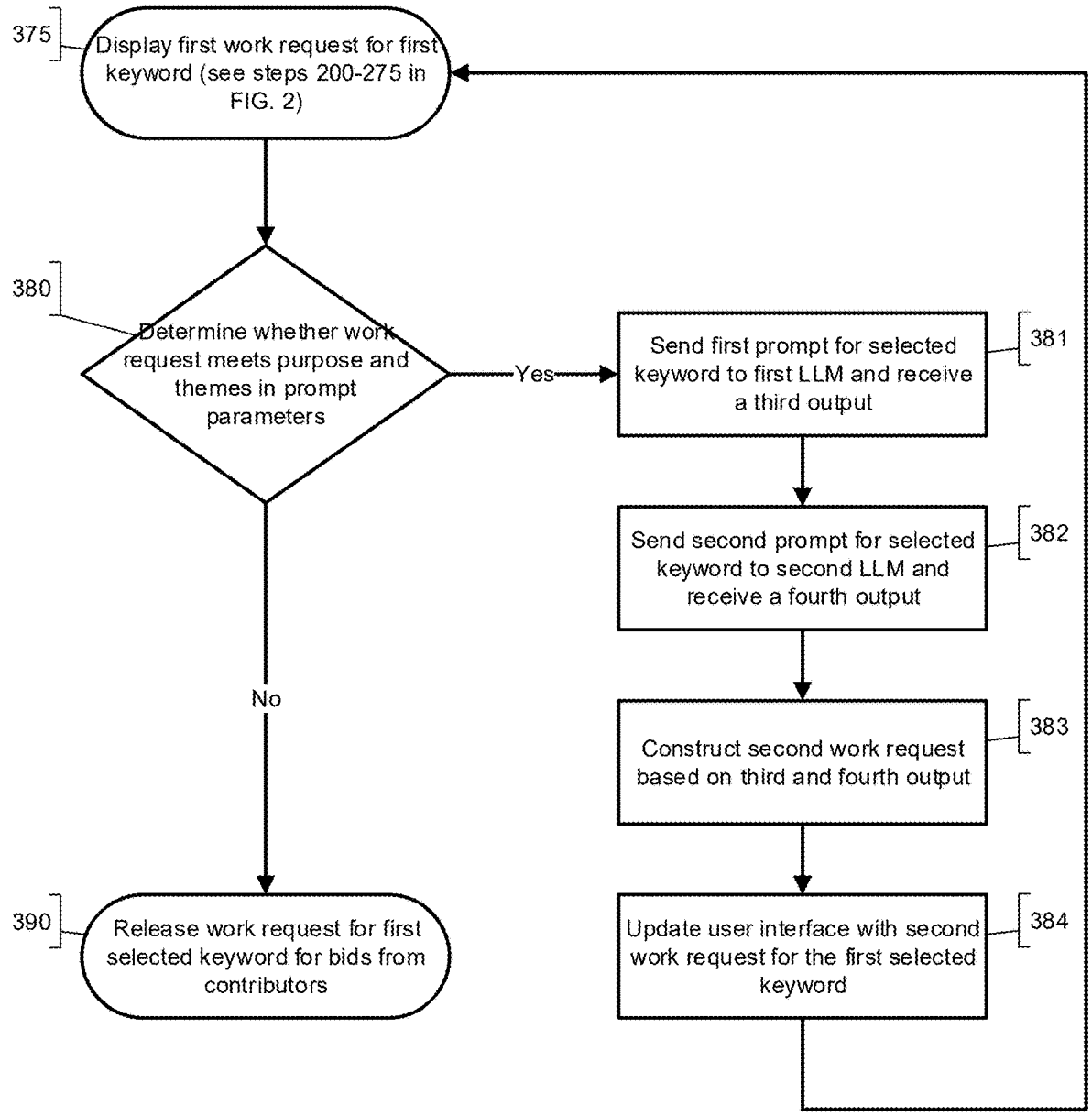
FIG. 3 depicts a flowchart for a method for revising a work request in accordance with one or more illustrative aspects described herein.

FIG. 3 depicts a flowchart for generating a SEO optimized work request in accordance with one or more illustrative aspects. FIG. 3 is an example of a workflow where a user may input parameters, select a keyword to generate a work request for, and construct a work request based on the parameters and the keyword.

Figure 5:
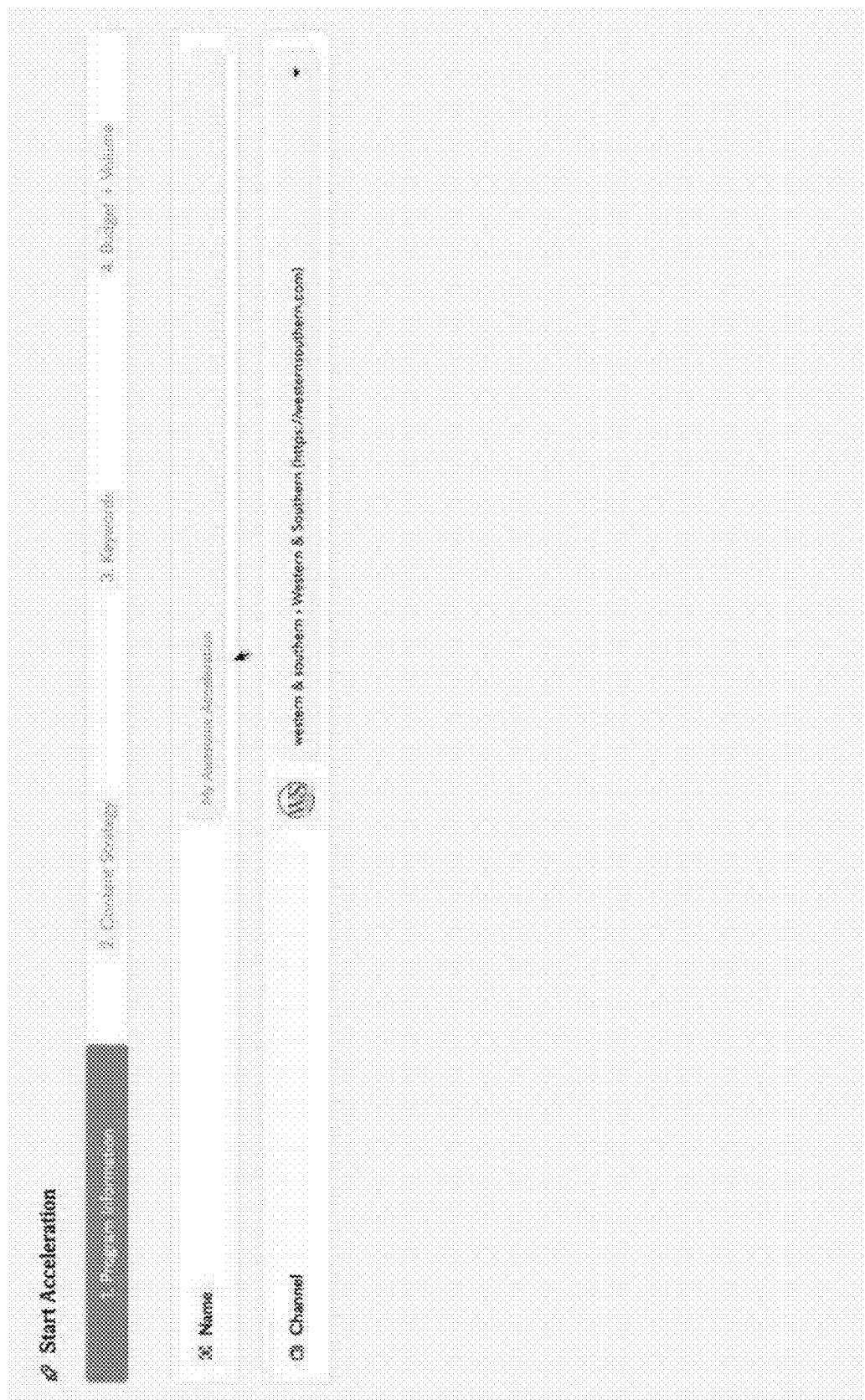
FIG. 5 depicts an example of a user interface where a user may configure parameters related to generating the SEO optimized work request in accordance with one or more illustrative aspects described herein.

In Step 200 a target entity parameter and one or more prompt parameters may be received via a user interface. The user interface may be displayed on a computing device similar to computing device 107, 109 as discussed with respect to FIG. 1A. An example of the user interface is depicted in FIG. 5 and will be discussed further below. The computing device may be connected by network 101 to other computing devices, including but not limited to third-party computing devices and/or computing devices configured to receive API requests from the user computing device.

The target entity parameter may indicate the target entity seeking to improve rank in search engine results for relevant keywords. For example, an entity parameter indicating "Company A" and/or "companyA.com" indicates that work requests may be directed at improving the ranking of Company A's performance with respect to selected keywords. The entity may be a corporation, a partnership, a nonprofit, an individual, and/or others looking to optimize search engine results relating to that entity.

A keyword may be one or more common words, phrases, and/or other components entered by consumer into a search engine. A keyword may also be referred to as a "search term." The keyword query will be described in further detail with respect to Step 215. The process of selecting keywords will be described in further detail with respect to Step 225.

A user may input one or more prompt parameters into a user interface. The prompt parameters may comprise one or more of: a purpose parameter, one or more theme parameters, one or more audience parameters, a budget parameter, an article number parameter, a word count parameter, and/or additional parameters. An example of a user interface by which a user may input one or more prompt parameters is displayed in FIGS. 6 and 7, discussed further below.

The purpose parameter may indicate the purpose for which a work request will be created. The purpose parameter may comprise text, string, words, phrase, and/or other representations. The one or more theme parameters may indicate specific topics to be included in a work request for an article drafted to fulfill the purpose indicated by the purpose parameter. A theme parameter may comprise a single word or phrase and may be selected from a list, an autocompleted search, entered manually, and/or selected from other methods.

The audience parameter may comprise a text string indicating the audience that the search optimization improvement plan is intended to capture. For example, an audience parameter for a search optimization plan intending to improve results with respect to retirement planning services may have an audience parameter comprising "people seeking financial security." Additionally or alternatively, the audience parameter may also define a demographic, such as "women aged 35-45." The audience parameter may also be selected from a list of potential types of audiences: for example, "women aged 20-35," "women aged 35-45," and so forth.

The budget parameter indicates the total budget allotted for the search engine optimization plan. The budget parameter may comprise the total budget for all contributors contracted with to implement the search engine optimization plan. Additionally or alternatively, when a user is developing the search engine optimization plan on behalf of the entity indicated by the entity parameter, the budget parameter may further comprise the price paid by the entity for the development and implementation of the search engine optimization plan.

The word count parameter may indicate the target length for an article drafted in response to a marketing outline generated as part of the search engine optimization plan. The word count parameter may indicate a maximum and/or minimum number of words. The user may also input additional parameters as appropriate to the search engine optimization plan.

The article number parameter may indicate the number of work requests to generate, wherein one work request may correlate to one article. An article may represent a new page added to the entity's website with the goal of improving the website's rank with respect to a selected keyword from the keyword query. Additionally or alternatively, the article number parameter may be calculated based on the word count parameter, the budget parameter, and an average price per article for articles with similar word counts. The average price per article for articles with similar word counts may be calculated based on prior articles and associated bids for the prior articles. The keyword query and keywords will be described with more detail with respect to Step 215.

Additionally or alternatively, one or more parameters may be configured to establish due dates for receiving one or more bids for one or more work requests and/or receiving one or more drafted articles based on one or more work requests. Bids and drafted articles will be discussed further with respect with FIG. 4.

Figure 8:
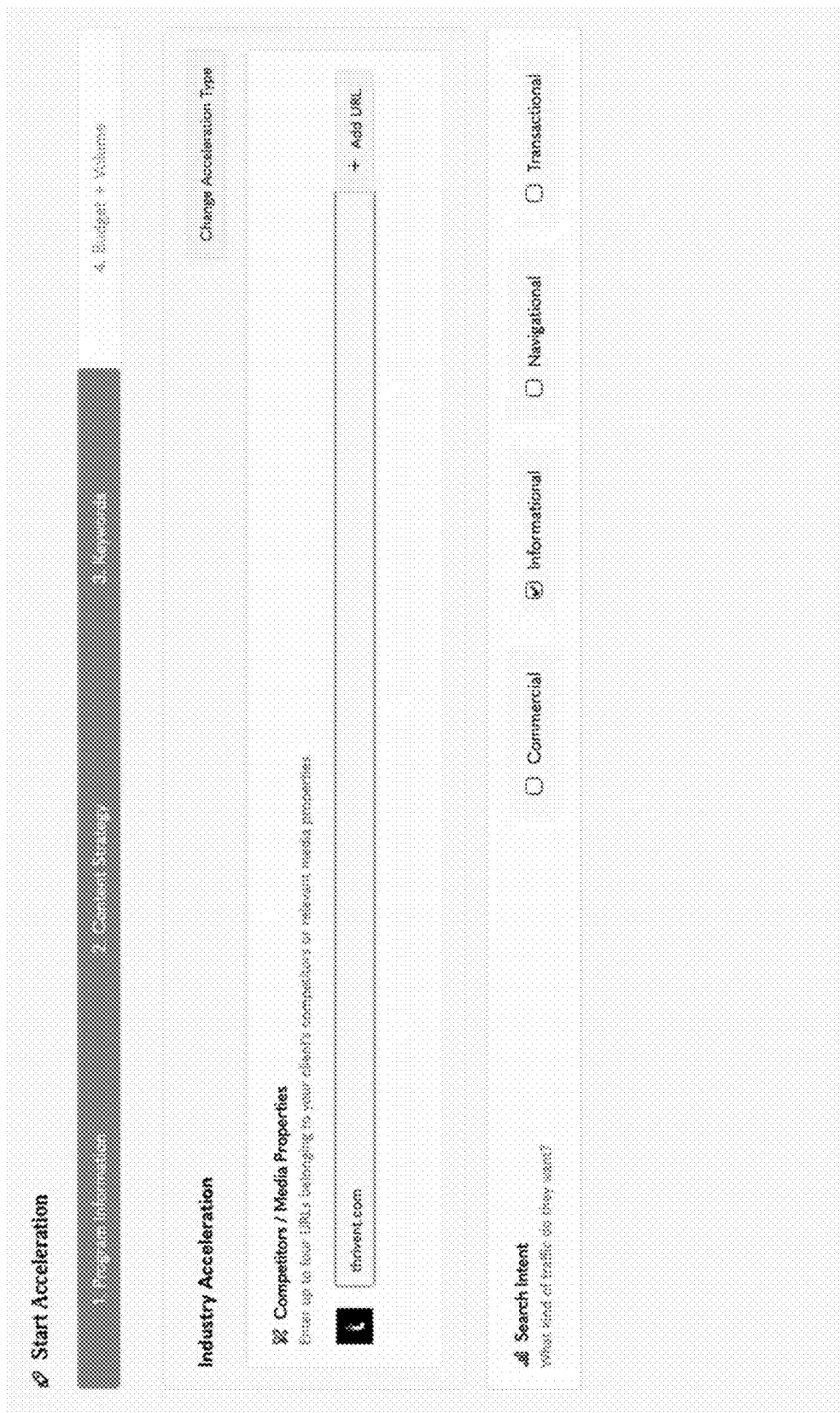
FIG. 8 depicts an example of a user interface where a user may further configure the keyword query in accordance with one or more illustrative aspects described herein.

In Step 205, the user may configure a keyword query based on one or more of the prompt parameters and one or more keyword query parameters. The user may configure the keyword query by providing inputs through a user interface displayed on a computing device similar to computing device 105, 107, or 109 as described with respect to FIG. 1A. An example of a user interface by which the user may input one or more keyword query parameters is depicted in FIG. 8, and will be discussed further below. The keyword query may identify keywords searched by consumers in search engines over a period of time. The keyword query parameters may comprise, but are not limited to: a search type parameter, a search intent parameter, and/or additional parameters depending on the search mode parameter.

The search type parameter may indicate a method by which a keyword query identifies potential keywords, e.g. search terms, for the search engine optimization plan. One or more search type parameters may be configured prior to implementing the search engine optimization plan, and the user may select one or more of the search type parameters. Additionally or alternatively, the search type parameter may also indicate one or more additional parameters for configuring the keyword query. The one or more additional parameters will be discussed below in association with a corresponding search type parameter value.

For example, a search type parameter comprising "industry acceleration" may indicate that the keyword query should identify the rank of other entities in the same industry compared to the target entity with respect to results for search terms, e.g. keywords, used by consumers. Industry may refer to other entities providing similar goods and/or services, information, or otherwise may be in related groups with the target entity. The other entities may be referred as comparison entities; comparison entities may be competitors and/or other relevant entities with the same industry as the target entity. One or more comparison URL parameters may configure the keyword query to retrieve the rank of the one or more comparison entities as well as the rank for the target entity for a keyword. A comparison URL parameter may be represented as a URL for a website associated with a comparison entity. A comparison URL parameter may identify a domain and/or subdomain associated with a comparison entity. For example, for a search engine optimization plan for Company A, the user may select "industry acceleration" as the search type parameter. The user may input one or more comparison URL parameters to configure the keyword query to retrieve ranks for one or more comparison entities, such as "companyB.com," "companyC.com," and/or others. Incorporating one or more comparison URL parameters into the keyword query may limit results of the keyword query to keywords wherein one or comparison URLs rank in the top 100 results. Additionally or alternatively, incorporating one or more comparison URL parameters into the keyword query may limit results of the keyword query to keywords where all of the incorporated comparison URL parameters rank into the top 100 results. Providing one or more comparison entities to target with the "industry acceleration" search type may allow an entity to directly compare search terms, e.g. keywords, where a competitor's website is more highly ranked in search results compared to the entity's website. Furthermore, configuring the keyword query to only return keywords for which one or more comparison URLs rank in the top 100 may allow the entity to target keywords that multiple competitors rank on, allowing them to quickly identify keywords that they should improve rank for.

A search type parameter indicating "manual acceleration" may indicate that the search results query should identify the rank of the entity within search results for one or more specified search terms, e.g. keywords. The user may input one or more search terms, e.g. keywords, for which the search results query should identify the rank of the entity's website for that search term, e.g. keyword. This search type parameter may be useful when an entity has already instituted SEO improvement plans, e.g. work requests, for one or more keywords and wishes to monitor performance for the one of more keywords.

A search type parameter indicating "trending acceleration" may configure the search results query to list search terms, e.g. keywords, with respect to one or more topic parameters, and display the rank of the entity's website with respect to results for those search terms, e.g. keywords. For example, a search type parameter comprising "trending acceleration" and a topic parameter comprising "retirement planning" may configure the search results query to list the most frequently-searched search terms, e.g. keywords, associated with the topic of "retirement planning." This search type parameter may be useful when an entity wishes to determine search terms, e.g. keywords, which have frequently been searched by consumers within a recent time span, and identify any search terms, e.g. keywords, related to the one or more topic parameters for the search engine optimization plan.

One or more search intent parameters may also indicate a classification of an intent behind a search term, e.g. keyword, when searched by the consumer. For example, the search intent parameter may comprise "commercial," "informational," "navigational," "transactional," and/or other intents by consumers. "Commercial" may indicate that the consumer performed the search with the intent to evaluate a potential purchase. For example, a consumer searching for "best individual retirement accounts" may be classified as a "commercial" search because the consumer intends to compare retirement accounts offered by one or more entities. "Informational" may indicate that the consumer intended to gather more information about a given topic. For example, a consumer searching for "how do I save for retirement" may be classified as an "informational" search because the consumer is intending to learn about retirement planning options and may be unaware of the potential commercial offerings for retirement planning. "Navigational" may indicate that the user is intending to locate a specific entity's website. For example, a consumer searching for "company A" may be classified as "navigational" because the user intends for the search results to display Company A's website so the user can access Company A's website. "Transactional" may indicate that the user intends to purchase a product or service; i.e., complete a transaction. For example, a consumer searching for "Company A IRA" may be classified as "transactional" because the user intends to open an IRA at Company A. Other search intents may also be possible and implemented in the search intent parameters.

Classifications of intents for search terms may be performed by third parties providing search term, e.g. keyword, analyses for the purposes of search engine optimization. Additionally or alternatively, classifications of intents may be performed by a third party owning and/or operating a search engine, such as Google. Using classifications provided by a third party owning and/or operating a popular search engine, such as Google, may improve the user's ability to identify keywords frequently searched by consumers, which may further improve SEO for those keywords. Additionally or alternatively, classifications may be specific to the procedures used by the analyzing party and may differ depending on the procedure. Potential values for the search intent parameter may be based on the classifications provided or determined the search term analyzing party.

The user may indicate one or more search intent parameters to configure the search term query to display search terms associated with that search intent. For example, the user may indicate a search intent parameter of "informational" to configure the search term query to display search terms, e.g. keywords classified as informational searches, or consumers intending to learn more about a product, service, and/or topic. Additionally or alternatively, the user may also indicate one or more search intent parameters to remove from the search term query. For example, the user may indicate that search terms classified as navigational searches should be excluded from the list of search term results. A user may choose to exclude navigational queries because navigational search terms provide fewer opportunities to change the entity website's rank with respect to a competitor; for example, a consumer who searches "Company B" likely intends to go to Company B's website and is not interested in visiting Company A's website, even if Company A provides the same products or services. By excluding navigational queries, the search query can be configured to list search terms, e.g. keywords, most likely to represent the highest possibility of rank improvement with investment.

In Step 215, one or more results of the keyword query, which may be based on the one or more prompt parameters and/or the one or more search parameters, may be displayed on the user interface. An example user interface for displaying the results of the keyword query may be depicted in FIG. 9, which will be discussed further below. The results of the keyword query may be keywords searched by consumers in search engines within a specified period of time; for example, within the last month, quarter, year, or other time increment. The results of the keyword query may further comprise additional results associated with each keyword.

Additional results may comprise, but are not limited to: related keywords, approximate number of searches per month, rank of the target entity, rank of one or more comparison URLs, and/or URL for a page of one or more comparison URLs. The results of the keyword query may be displayed in the user interface, which may be displayed on the computing device similar to computing devices 107, 109 as described with respect to FIG. 1A. The keyword query may be sent as an API request to a third party from computing device 107, 109 over network 101 to a data server 105, wherein data server 105 may be third party server hosting keyword tracking and analysis services. Examples of potential third parties may include SEMRush, Ahrefs, Google Keyword Planner, and/or others. The keywords may be keywords entered by consumers in search engines such as Google, Bing, DuckDuckGo, and/or others.

The display of keywords may be ordered according to approximate number of searches per month across all consumers. Additionally or alternatively, the display of key words may display the approximate number of searches per month per keyword. Additionally or alternatively, the display may further display the target entity website's rank for each keyword. Additionally or alternatively, based on search parameters indicating that the keyword query should list the rank of one or more comparison entities for each keyword, the display may further indicate the rank of the one or more specified competitors for each keyword. If multiple comparison URL parameters were provided, the display may further display the comparison URL with the highest rank for each keyword and the corresponding rank. The comparison URL may also be displayed with a link to a specific page in the comparison URL domain and/or subdomain linked on an SERP for the keyword.

The user may modify the keyword query based on or more of the prompt parameters and/or keyword query parameters. Additionally or alternatively, the user may add additional filter parameters to the keyword query to modify the keyword query results or modify the display of the keyword query results. The filter parameters may comprise, but are not limited to: keyword exclusion parameter, difficulty range parameter, minimum average hits parameters, and/or others.

The keyword exclusion parameter may be used to exclude one or more keywords from the keyword query results. For example, if the keyword query results include "Company B" when the entity is Company A, the user may add "Company B" to the keyword exclusion parameter to remove "Company B" from the keyword query results.

The difficulty range parameter may be a parameter indicating how likely an entity is to be ranked within top results for a search based on a given keyword, e.g., how likely the entity is to gain and/or achieve a desired domain authority for the given keyword. The top results may be defined by websites that are ranked within a first number of results; for example, the top ten results. The difficulty range parameter may have a value range of 0 to 100, where 0 may indicate that the target entity's website could easily rank in the top results for a given keyword, while 100 may indicate that it would be extremely difficult for the target entity's website to rank in the top results for a given keyword. The difficulty range parameter may incorporate a domain authority parameter, wherein the domain authority parameter indicates the relative strength of a website domain against other website domains within the same industry. The difficulty range parameter may further incorporate a domain authority parameter for all of the websites within the top results for a search based on a given keyword.

The difficulty range parameter may be represented as two values, wherein a first value may represent a minimum difficulty score and a second value may represent a maximum difficulty score. An appropriate value for the difficulty range parameter may depend on the target entity, the industry, and the target entity's goal for the search engine optimization plan. For example, a user building a search engine optimization plan may set the difficulty range parameter to 0-40, to target easier keywords, for a target entity that is relatively new to an industry. Additionally or alternatively, a user building a search optimization plan for a target entity that is established in the industry and has wide domain recognition may set the difficulty range to 40-90, as the target entity may have a sufficient domain authority to rank against other high-domain authority entities.

The minimum average hits parameter may filter out keywords without a sufficient number of hits per month. For example, a minimum average hits parameter that is set to "750" may remove any keywords not, on average, being searched at least 750 times per month by consumers over the last twelve months. The keyword's average number of hits per period of time may be calculated by the same source providing the results of the keyword query. Additionally or alternatively, the minimum average hits parameter may refer to average number of hits over a different period of time, such as week, quarter, year, or others. Additionally or alternatively, the minimum average hits parameter may be defined as a range, and the minimum average hits parameter may indicate both a minimum average hits and a maximum average hits.

Figure 10:
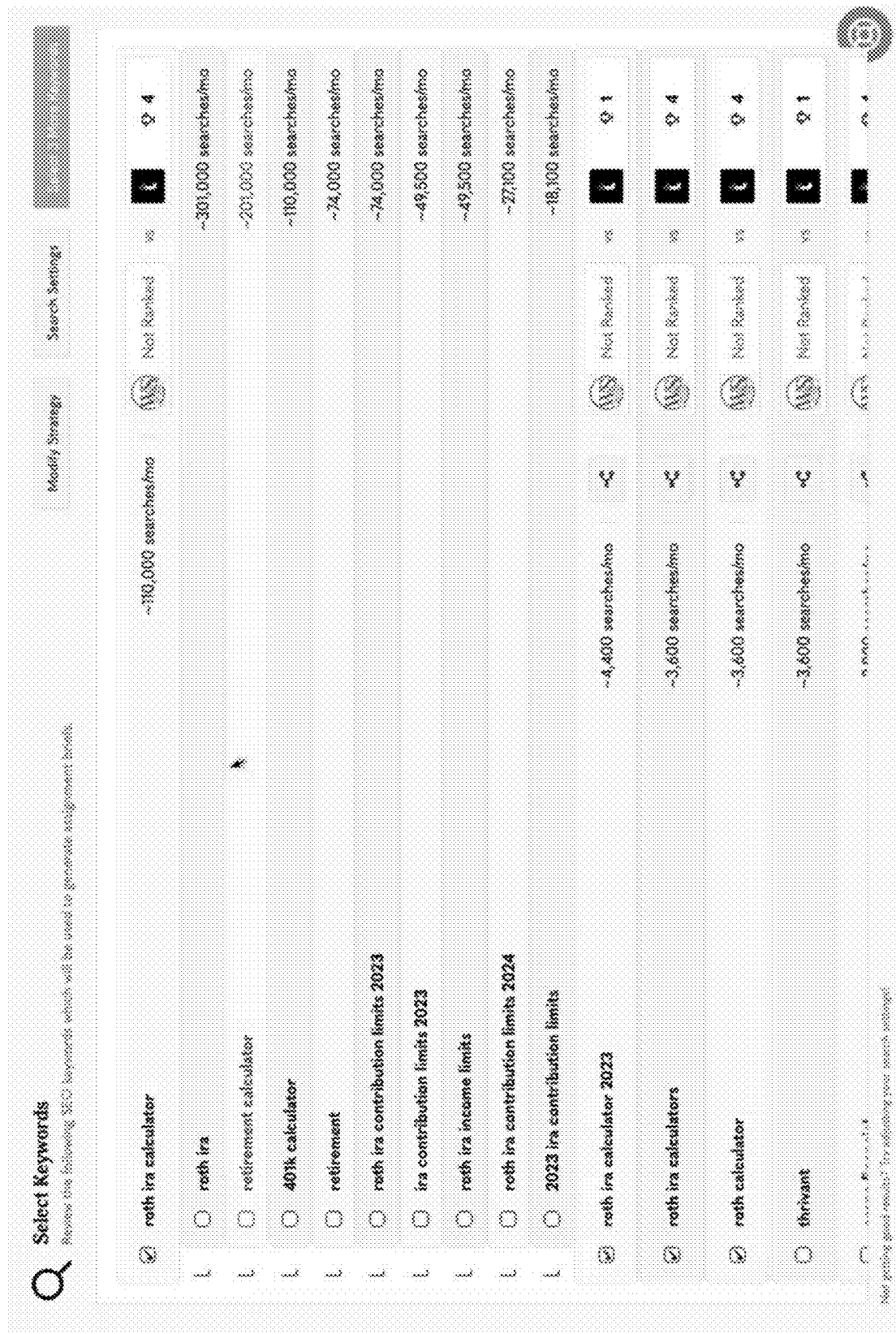
FIG. 10 depicts an example of a user interface further displaying results of the keyword query in accordance with one or more illustrative aspects described herein.

The user may also be able to request display of keywords that are associated with a keyword listed in the keyword query search results. For example, the keyword query results may include the keyword "roth ira calculator"; the user may be able to request the display of keywords associated with "roth ira calculator," such as "roth ira," "retirement calculator,", "401k calculator," etc. The associated keywords may also be displayed with the average number of hits per month. An example of a user interface showing related keywords is depicted in FIG. 10, which will be discussed further below.

In Step 225, the user may select a first keyword from the keyword query results to generate work requests. Additionally or alternatively, the user may select one or more of the associated keywords to generate work requests for one or more associated keywords. Selecting one or more keywords to generate one or more work requests may be desirable to draft one or more articles creating a "pillar area," where multiple articles targeting multiple related keywords may improve a target entity's domain authority with respect to all of the related keywords. Improving the target entity's domain authority with respect to multiple related keywords may in turn improve the target entity's rank on an SERP for one or more related keywords. A maximum number of selected keywords may be set based on the article number parameter discussed with respect to Step 200.

In Step 235, a first prompt and a second prompt are generated, based on one or more of the prompt parameters and the first keyword. Additionally or alternatively, the first and second prompts may be identical. Additionally or alternatively, if a user has selected multiple keywords, a first and second prompt may be constructed for each keyword and one or more of the prompt parameters.

In Step 245, the first prompt is sent to a first language learning model via a first API request and a first output received from the first language learning model. The first API request may be sent over network 101 from the computing device similar to computing devices 103, 105, 107, and/or 109 as described with respect to FIG. 1A. The first language learning model (LLM) may be an LLM owned and/or operated by a third-party. The first LLM may be selected based on one or more factors such as, but not limited to: speed when responding to a prompt, responsiveness to a prompt, usage of natural language in a response, privacy, data security, and/or other factors. For example, the first LLM may be GPT 4.0 when GPT 4.0 responses are more responsive to a prompt, have better usage of natural language in the response compared to other LLMs responding to similar prompts, and/or provide increased privacy and/or data security for confidential data.

The first prompt may be constructed based on a first master prompt. The first master prompt may be configured in advance based on prior testing with the first LLM to ensure that outputs in response to prompts are optimized for use in the dynamic work request generation process. For example, the first master prompt may comprise instructions for style, perspective, and/or additional instructions. The first master prompt may be represented as a string. The first master prompt may further comprise placeholders for parameters.

For example, the first master prompt may comprise a request for the first LLM to generate a set of instructions for a potential contributor, wherein the instructions incorporate one or more of the theme parameters, the audience parameter, the word count parameter, and/or the first keyword. Additionally or alternatively, the first master prompt may also comprise a request for the first LLM to generate instructions that direct a potential contributor to exclude one or more prompt parameters from the article. For example, the first master prompt may comprise a request for the first LLM to draft instructions that direct a potential contributor to exclude the entity parameter from the article. These configurations may allow a user to quickly generate a first prompt for a wide variety of entities, keywords, audiences, themes, and/or other parameters.

The first prompt may be constructed based on the first master prompt by one or more of the following techniques: string interpolation, string concatenation, format string, regular expressions, and/or others. String interpolation may be preferred by allowing for easier management of the first master prompt, the first keyword, and the one or more prompt parameters. The first prompt may be constructed by replacing one or more parameter placeholders in the first master prompt with a corresponding parameter.

The first prompt may be sent to the first LLM via an API request to the first LLM. Output from the first LLM in response to the first prompt may be received as a first output. The first prompt may comprise a request that the first LLM generate instructions for a human writer to draft an article based on the first keyword and one or more of the prompt parameters. Using the first prompt, constructed based on the first master prompt, first keyword, and one or more prompt parameters, and output from the first LLM may allow the user to draft instructions for contributors much more quickly than the user may be able to do manually.

For example, if the entity parameter is "Company A," one theme parameter is "to be a leading voice in financial planning," the audience parameter is "people saving for retirement," and the word count parameter is "1200," the first prompt may comprise a request to the first LLM to generate a set of instructions for a contributor, wherein the instructions may direct the contributor to draft a 1200 word article, directed at people saving for retirement, and is intended to establish Company A as a leading voice in financial planning but does not mention Company A. Additionally or alternatively, if the theme parameter is "to encourage readers to open retirement accounts at Company A," the first prompt may comprise a request to the first LLM to generate instructions to include "Company A" in the article.

Additionally or alternatively, the first prompt may incorporate one or more search parameters. For example, if the search intent parameter is "commercial," the first prompt may comprise a request to the first LLM to generate a set of instructions for a contributor to explain to a consumer why the consumer should select Company A's services. Other variants of the first prompt may be possible based on additional parameters.

In Step 255, the second prompt is sent to a second language learning model via a second API request and a second output received from the second language learning model. The second API request may be sent over network 101 from the computing device similar to computing devices 107, 109 as described with respect to FIG. 1A. The second language learning model (LLM) may be an LLM owned and/or operated by a third-party. The second LLM may be selected based on one or more factors such as, but not limited to: speed when responding to a prompt, capability of incorporating live and/or recently updated data, and/or other factors. For example, the second LLM may be Google AI Gemini when Google AI Gemini can search a keyword in a search engine and incorporate results from the search into a response. The first LLM and the second LLM may be different when the second LLM does not ensure that prompts and/or outputs are kept confidential. For example, the first LLM may be GPT 4.0 because GPT 4.0 allows for confidential prompts and/or outputs, meaning that GPT 4.0 does not use prompts and/or outputs for further training of the GPT 4.0 model, while the second LLM may be Google AI Gemini because Google AI Gemini may be able to perform live searches, but does not allow for confidential prompts and/or outputs. Additionally or alternatively, the first and second LLM may be the same.

The second prompt may be constructed based on a second master prompt. The second master prompt may be configured in advance based on prior testing with the second LLM to ensure that outputs in response to prompts are optimized for use in the dynamic work request generation process. For example, the second master prompt may comprise instructions to request the second LLM to initiate a search for a keyword parameter on a search engine, select a specified number of the top ranked results for the keyword parameter, analyze the structure of the top ranked results for the keyword parameter, and/or additional instructions. The second master prompt may further comprise instructions to request that the second LLM generate an outline for an article, based on top ranked results for the keyword parameter, that improves upon the top ranked results. The second master prompt may be represented as a string. The second master prompt may further comprise placeholders for parameters.

The second prompt may be constructed based on the second master prompt by one or more of the following techniques: string interpolation, string concatenation, format string, regular expressions, and/or others. String interpolation may be preferred by allowing for easier management of the second master prompt, the first keyword, and the one or more prompt parameters. The second prompt may be constructed by replacing one or more parameter placeholders in the second master prompt with a corresponding parameter. Parameters for the second prompt may comprise the first keyword. Based on the second LLM's privacy and/or data security policies, parameters for the second prompt may exclude the one or more prompt parameters, audience parameter, target entity parameter, and/or others. Parameters may be excluded based on a desire to keep the target entity's marketing plans confidential. Limiting parameters in the second prompt to the first keyword may allow work requests to generated with the benefit of the second LLM's performance of a live search without exposing confidential information to the second LLM.

Additionally or alternatively, the number of top ranked websites for the second LLM to process may be configured as a parameter in Step 200 or 205. The live search may be performed by the second LLM against a search engine, such as Google, Bing, DuckDuckGo, and/or others. The search engine may be the same search engine from which keywords are collected for the purpose of the keyword query search in Step 215.

For example, if the first keyword is "roth ira calculator," the second prompt may direct the second LLM to initiate a search for "roth ira calculator" on a search engine, select a specified number of top ranked results, analyze the structure of the top ranked results, and generate an outline, based on the analysis, for an article that could be more highly ranked for "roth ira calculator" than the top ranked results.

The second prompt may be sent to the second LLM via an API request to the second LLM. Output from the second LLM in response to the second prompt may be received as a second output.

In Step 265, the first output and the second output associated with the first keyword may be combined to construct a first work request. A first section of the work request may comprise the first output, wherein the first section may provide instructions for a contributor to draft a first article based on the first keyword and one or more of the prompt parameters. A second section of the work request may comprise the second output, wherein the second section may provide an outline for the first article. The first section may be a partial excerpt from the first output. The second section may be a partial excerpt from the second output. A title for the work request may comprise an excerpt from the first output. The title may include the first keyword. Combining output from the first LLM and the second LLM may allow work requests to be generated with the benefit of strengths from both LLMs while reducing and/or avoiding exposure of confidential information. Output from additional LLMs may also be added based on the desired work request and the strengths of the additional LLMs.

In Step 275, the first work request for the first keyword may displayed on the user interface via the computing device. The user may review the first work request to ensure that the first work request meets the one or prompt parameters. The user may also modify or regenerate the first work request, as will be described with more detail with respect to FIG. 3. An example user interface for modifying the first work request may be depicted in FIG. 12, which will be discussed further below. The user interface depicted in FIG. 12 may be accessible from the user interface depicted in FIG. 11. Additionally or alternatively, the user may delete the first work request and the first keyword.

Figure 11:
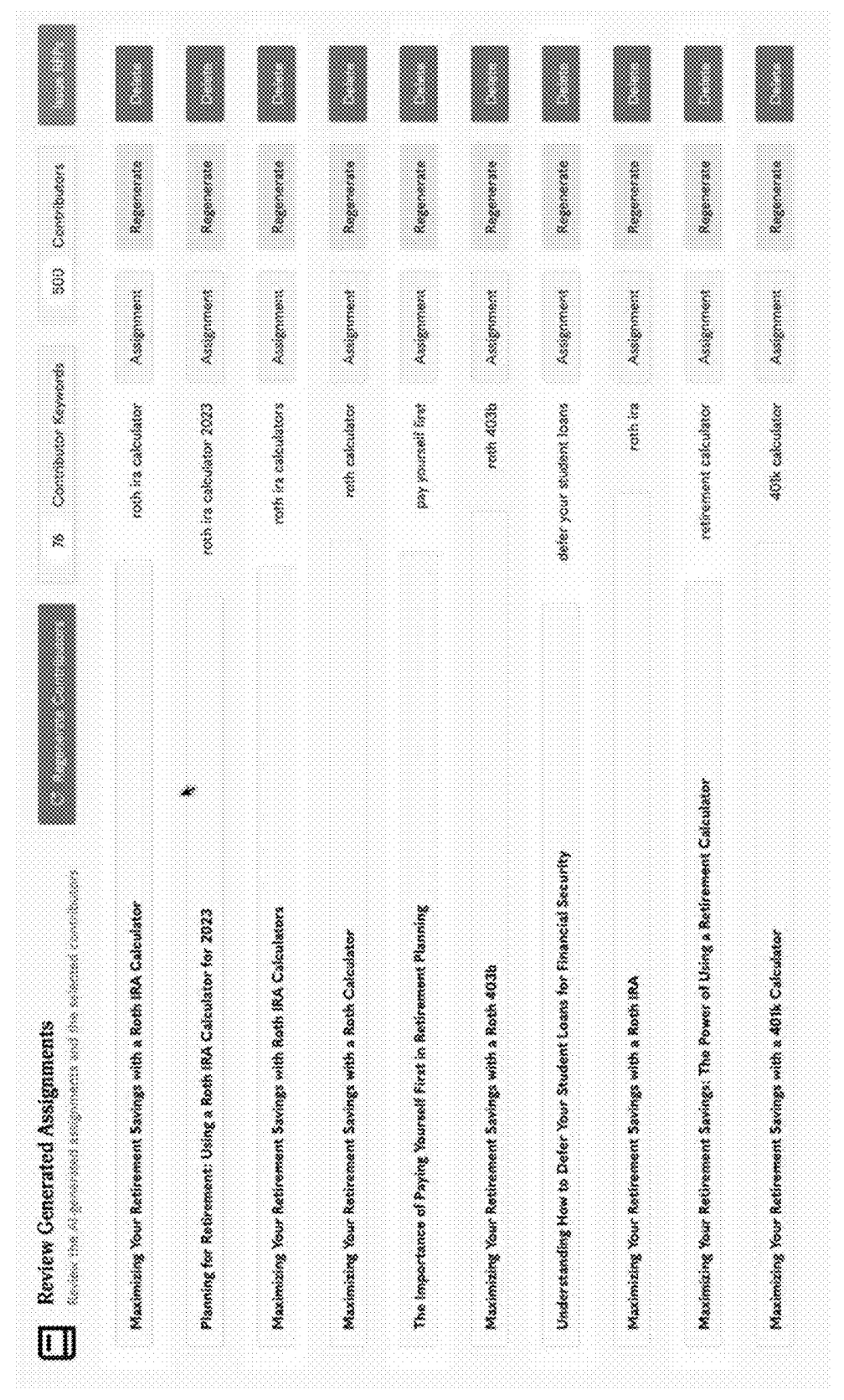

Additionally or alternatively, if multiple keywords were selected, work requests for each selected keyword may be displayed. The user may be able to select one, several, or all work requests to be regenerated and/or deleted. An example of the user interface for displaying one or more work requests and controls for modifying, regenerating, and/or deleting a work request is depicted in FIG. 11, which will be discussed further below.

Figure 4:
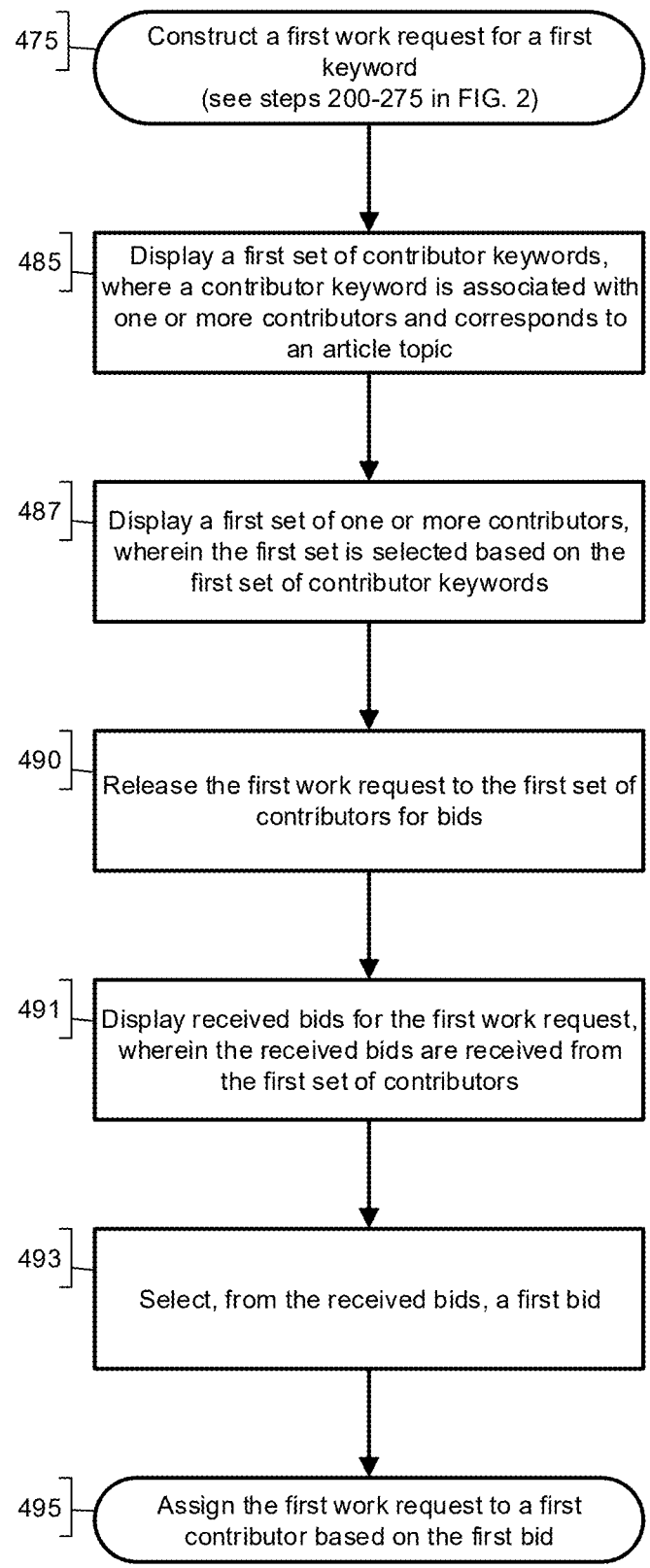
FIG. 4 depicts flowchart for a method to select a contributor to draft an article based on a work request in accordance with one or more illustrative aspects described herein.

Step 275 may be followed by Steps 375-390 in FIG. 3, detailing a process by which a work request may be regenerated, and/or Steps 475-493 in FIG. 4, detailing a process by which a work request may be released to contributors for bids, bids evaluated, and the work request assigned to a contributor.

FIG. 3 depicts a flowchart for a method for revising a work request in accordance with one or more illustrative aspects described herein. Steps taken to generate a work request may be similar to Steps 200-275 as described above with respect to FIG. 2, in which the user inputs one or more prompt parameters, inputs one or more search parameters, and selects a first keyword from a list of keywords searched by consumers to generate a work request for.

Figure 12:
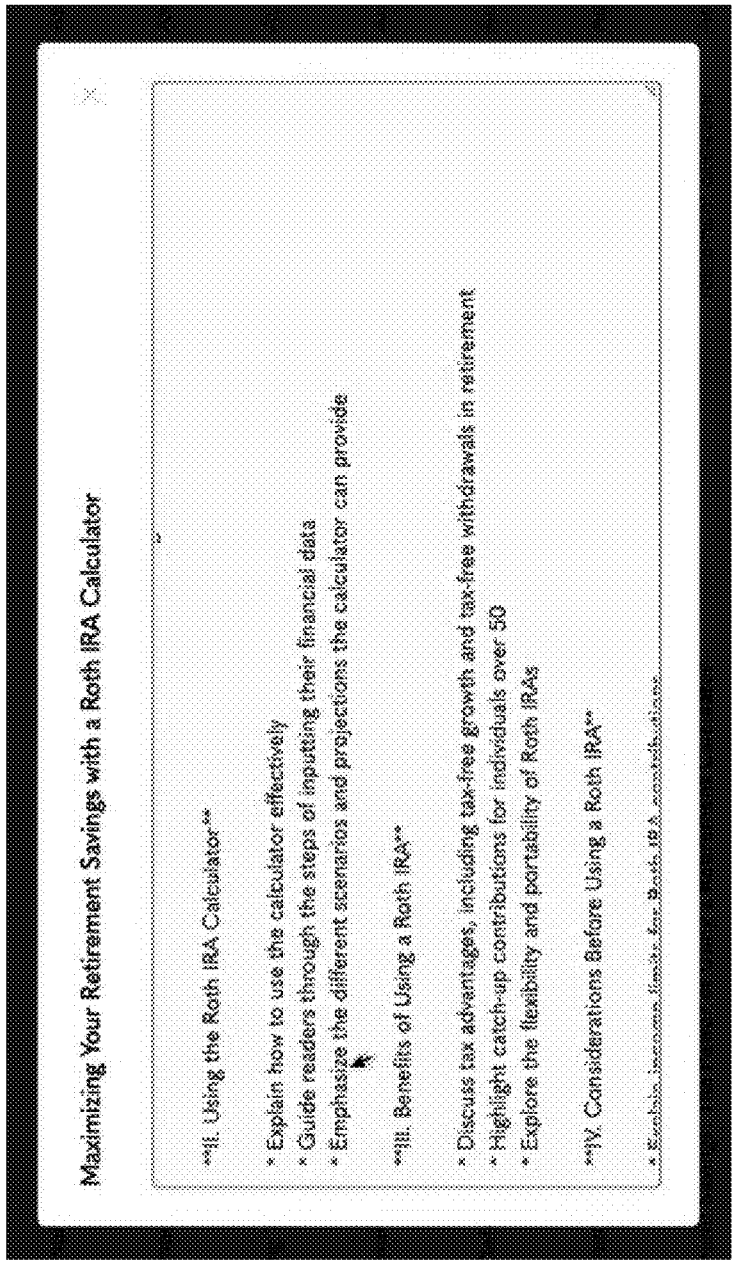
FIG. 12 depicts an example of a user interface displaying a first work request associated with a first keyword in accordance with one or more illustrative aspects described herein.

In Step 375, a first work request for a first keyword may be displayed to the user via a user interface on a computing device. The user interface may be similar to the user interface depicted in FIG. 11, which will be discussed further below. The computing device may be similar to computing devices 107, 109 as described with respect to FIG. 1A. An example user interface for displaying the first work request is depicted in FIG. 12.

In Step 380, the user may decide whether to "regenerate" the first work request. If the user does not decide to regenerate the first work request, the user proceeds to Step 390 and releases the first work request for bids from contributors. Additionally or alternatively, the user may make manual edits to the first work request in Step 380 before releasing the work request in Step 390. Additionally or alternatively, if work requests have been displayed for multiple selected keywords, the user may choose to select to regenerate one, some, or all of the work requests.

If the user decides to regenerate the work request, the user may re-send the first prompt to the first LLM and receive a third output in Step 381. The first prompt may have been constructed in a method similar to that described in Step 235 and may incorporate, but is not limited to, the first keyword, one or more prompt parameters, one or more search parameters, and/or other parameters. The first prompt may be sent from the computing device to the first LLM as an API request similar to the process described with respect to Step 245 in FIG. 2.

In Step 382, the user may re-send the second prompt to the second LLM and receive a fourth output. The second prompt may have been constructed in a method similar to that described in Step 235 and may incorporate, but is not limited to, the first keyword, one or more prompt parameters, one or more search parameters, and/or other parameters. The second prompt may be sent from the computing device to the second LLM as an API request similar to the process described with respect to Step 255 in FIG. 2.

In Step 383, a second work request may be constructed based on the third and fourth output. The second work request may be constructed in a process similar to the construction of the first work request as described with respect to Step 265 in FIG. 2. Similar to the first work request, the second work request may comprise a first section of the second work request, comprising instructions for how to draft an article and corresponding to the third output, and a fourth section, comprising an outline for an article and corresponding to the fourth output. The second work request may correspond to the first keyword. Additionally or alternatively, the second work request may be described a "re-constructed" or "regenerated" version of the first work request.

In Step 384, the user interface is updated with the second work request based on the third and fourth output. The second work request may then be displayed alongside the first keyword in a return to Step 375. The user may then evaluate the second work request and decide whether to use the second work request or regenerate the second work request, similar to the process described in Step 380 with respect to the first work request.

In Step 390, the user may release the second work request for bids from contributors. Additionally or alternatively, the user may regenerate one, some, or all work requests for all selected keywords before releasing the work requests in Step 390.

FIG. 4 depicts flowchart for a method to select a contributor to draft an article based on a work request in accordance with one or more illustrative aspects described herein. In Step 475, a first work request may have been generated in a process similar to that described with respect to FIG. 2, wherein a user initiates a search for keywords based on one or more prompt parameters and one or more keyword query parameters, selects a first keyword, and constructs the first work request based on output from a first LLM and/or a second LLM (one or more LLMs may be used, as needed). This process may be described with more detail with respect to FIG. 2. Additionally or alternatively, the first work request may also have been modified or regenerated in a process similar to that described with respect to FIG. 3.

In Step 485, a first set of contributor keywords, comprising one or more contributor keywords, may be displayed on a user interface, wherein a contributor keyword is a keyword which may be associated with a contributor. An example user interface by which the user may view the first set of contributor keywords is depicted in FIG. 13, which will be discussed further below. The user interface may be similar to the user interface described with respect to FIG. 2 and may be displayed on a computing device similar to computing device to 105, 107, and/or 109 as described in FIG. 1A. A contributor keyword may be similar to a keyword collected from searches by consumers on search engines, as was described with respect to Step 200. A contributor may be a human who drafts articles based on a work request, where the work request may be generated as described with respect to FIG. 2.

The first set of contributor keywords may be based on a fifth output, received based on sending a fifth prompt to a third LLM. The third LLM may be similar to the first LLM and/or second LLM. The third LLM may be selected based on factors including, but not limited to: speed, privacy, and/or data security. The fifth prompt may be constructed using a method similar to that used for the first prompt, such as a master prompt and string interpolation. The fifth prompt may comprise instructions to list keywords related to one or more of the first keyword, one or more theme parameters, and/or other parameters. The third LLM may also be selected based on which parameters are included in the fifth prompt. For example, if the fifth prompt comprises the first keyword and one or more theme parameters, the third LLM may be selected based on privacy and data security to keep marketing information confidential. If multiple keywords have been selected for work request generation, the fifth prompt may also comprise all of the selected keywords and may only be executed once for all of the selected keywords, rather than once per selected keyword.

The user may manually add and/or remove a contributor keyword from the first set of contributor keywords to ensure that the contributors associated with the first set of contributor keywords are qualified to draft an article based on the first work request, as will be described further with respect to FIG. 13. The user may also re-send the fifth prompt to the third LLM to "regenerate" the first set of contributor keywords. The user may choose to regenerate the first set of contributor keywords if the first set of contributor keywords comprises multiple contributor keywords that the user determines are not relevant to the one or more work requests.

For example, if the first keyword was "roth ira calculator," the first set of contributor keywords may comprise "deferment," "Roth IRA," "budgeting," and/or others. Additionally or alternatively, if the first keyword was "roth ira calculator" and the first set of contributor keywords included "rental cars," the user could remove "rental cars" from the first set of contributor keywords because "rental cars" was not related to the first keyword. Additionally or alternatively, the user may regenerate the entire first set of contributor keywords. An illustrative example of the display comprising the set of contributor keywords is shown in FIG. 13.

Figure 14:
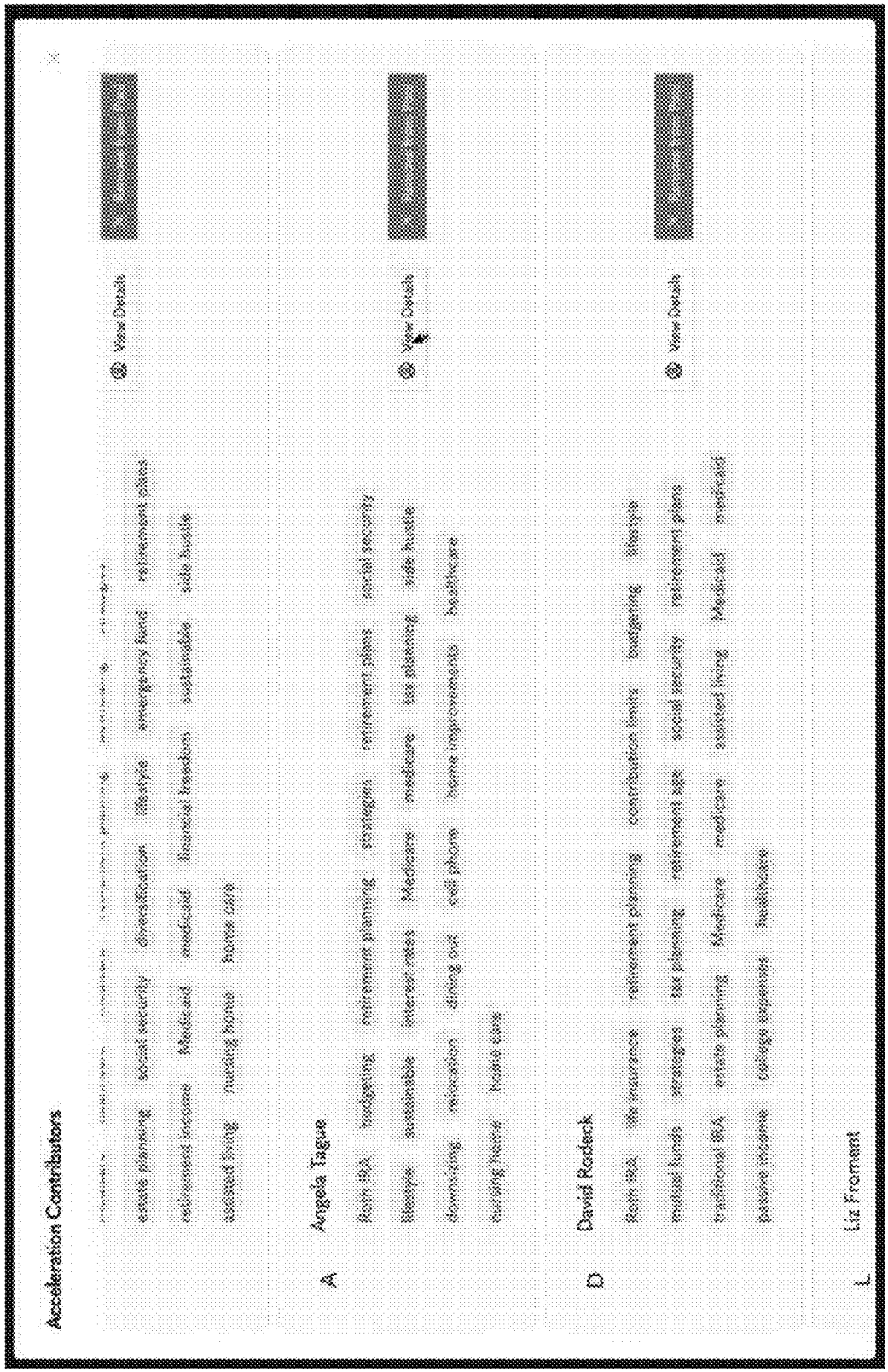
FIG. 14 depicts an example of a user interface displaying potential contributors in accordance with one or more illustrative aspects described herein.

In Step 487, a first set of contributors are displayed to the user interface, wherein the first set of contributors is selected based on the first set of contributor keywords. A contributor may be selected for the first set of contributors based on being associated with one or more contributor keywords within the first set of contributor keywords. Additionally or alternatively, the user may manually add or remove a contributor from the first set of contributors. An illustrative example of the display comprising the first set of contributors is shown in FIG. 14.

Additionally or alternately, a set of one or more contributors may be configured in advance of generating the SEO-optimized work request. The set of one or more contributors may be associated by a private entity, such as by an entity implementing the method of generating a search engine optimization plan on behalf of the target entity indicated by the target entity parameter. The private entity may use an approval process before adding a contributor to the set of one or more contributors. Additionally or alternatively, the set of one or more contributors may be a public grouping where any human may join the grouping and bid on a work request.

A contributor may be associated with a second set of contributor keywords, where the second set of contributor keywords may comprise one or more contributor keywords. The second set of contributor keywords may be generated based on sixth output from a sixth prompt to the third LLM. The third LLM may be used because the third LLM was previously used to generate the first set of contributor keywords, and the third LLM may be more likely to return similar keywords for the second set of contributor keywords. The sixth prompt may be constructed using methods similar to the first prompt, using a master prompt and string interpolation. The sixth prompt may comprise instructions to list keywords associated with one or more inputs associated with the contributor. Inputs may comprise the contributor's bio, drafted by the contributor and describing the contributor's background and/or experience, one or more prior articles drafted by the contributor, and/or other data associated with the contributor. The prior articles may have been drafted based on prior work requests, which may have been generated through a process similar to that described with respect to FIG. 2, and/or by through another process. Additionally or alternatively, the sixth prompt may be sent to one or more different LLMs based on a different LLM providing better analysis of longer texts. For example, Anthropic Claude may provide more accurate keyword identification for text longer than 800 words, while GPT 4.0 provides more accurate keyword identification for text 800 words or less.

One or more prior articles may also be associated with the contributor. A set of contributor keywords may also be generated for each of the one or more prior articles associated with the contributor. For a set of contributor keywords associated with an article, a prompt similar to the sixth prompt may be sent to the third LLM, wherein inputs may be limited to the text of the article. Prompts to list contributor keywords associated with an article may also be sent to a different LLM that provides better analysis of longer texts, as many articles may be 1200 words, 1600 words, or even longer. The set of contributor keywords associated with an article may be displayed in association with the article. This may allow a user to quickly scan one or more articles associated with the contributor, determine if the contributor's articles address similar areas as the first keyword and first work request, and add/remove the contributor to/from the first set of contributors.

Prompts to generate the first and second sets of contributor keywords, and additional sets of contributor keywords associated with articles, may be sent upon receiving an indication from the user that the one or more work requests are complete. Generating contributor keywords based on prompts to a third LLM may reduce an amount of database storage and management that may otherwise be necessary to classify contributors and articles. Instead, by sending prompts to the third LLM, or additional LLMs as previously discussed, the user may be able to quickly identify keywords associated with the first work request, identify keywords associated with one or more contributors, and identify keywords associated with each contributor's one or more articles, without also having to maintain database storage, management, classification of keywords, etc., which may be a time and labor intensive project.

Additionally or alternatively, the user may view the display of the first set of contributors, then modify the first set of contributor keywords as described with respect to Step 485. The user may continue to modify the first set of contributor keywords and/or the first set of contributors until both are configured to the user's satisfaction. Selecting the first set of contributors based on the first set of contributor keywords may improve SEO for the first work request because the first set of contributors may have experience in writing on the topics in the first work request.

In Step 490, the first work request may be released to the first set of contributors for bids. "Releasing" the first work request may comprise sending a message to the first set of contributors over network 101 from the computing device similar to computing devices 107, 109 in FIG. 1A. The first set of contributors may receive the message on computing devices similar to computing devices 107, 109. The message may comprise, but is not limited to: the first work request, the first keyword, the date and/or time that contributors must submit bids, and/or additional information. The total number of work requests that may be released may be determined by the article number parameter.

Additionally or alternatively, multiple work requests associated with different keywords may be released to the first set of contributors. Multiple work requests may be released as part of one or more messages to the first set of contributors.

In Step 491, received bids for the first work request may be displayed on the user interface. Bids may be received from one or more contributors within the first set of contributors. Bids may be sent over network 101 to computing device 105, 107, and/or 109. A bid may comprise a contributor's offered price for drafting an article based on the first work request. A bid may also comprise a contributor's offered timeline for drafting an article based on the first work request. Additionally or alternatively, if multiple briefs were sent to the first set of contributors, a bid may comprise a contributor's offered price to draft articles for one, some, or all of the work requests sent to the first set of contributors. A bid in response to multiple work requests may indicate which work requests the contributor is willing to draft, such as one, some, or all work requests.

Bids from one or more contributors may be compared against each other. Bids may be ranked based one or more factors, including, but not limited to: offered price, offered timeline, number of work requests bid on, offered price per article, and/or other factors. Bids may also be ranked based on factors associated with a contributor associated with a bid, such as, but not limited to: contributor's prior work history with the target entity, contributor's rating by prior entities, number of contributor keywords associated with contributor and also within the first set of keywords, and/or other factors. Additionally or alternatively, bids may be hidden from display based on offered price exceeding a threshold. The threshold may be set based on the budget parameter. Bids which may be hidden based on exceeding a threshold may be manually unhidden from display by the user.

In Step 493, a first bid may be selected from the received bids. The first bid may be associated with a first contributor. Additionally or alternatively, one or more bids for one or more work requests may be selected, where the one or more bids may be associated with one or more contributors. A non-selected bid may be disabled for selection based on corresponding to a second work request, where a second bid, corresponding to the second work request, is currently selected. Additionally or alternatively, one or more bids corresponding to the second work request may be selected at the same time.

A budget parameter may set a maximum price threshold that the one or more selected bids may not exceed. The budget parameter may be similar to the budget parameter discussed with respect to FIG. 2 and may represent a total budget for bids. A current total bid price parameter may correspond to a total price associated with all selected bids. The current price may be displayed on the user interface operating on computing device 105, 107, and/or 109. A non-selected bid may be disabled for selection based on the price associated the non-selected bid exceeding the difference between the current price associated with all selected bids and the budget parameter.

Additionally or alternatively, the first bid may be removed or "un-selected." If the first bid is unselected, the price associated with the first bid may be deducted from the current total bid price parameter. Additionally or alternatively, a non-selected bid that had been disabled for selection based on the price of the non-selected bid exceeding the difference between the current total bid price parameter, when including the first bid, and the budget parameter may be re-enabled for selection upon removal, e.g. un-selection, of the first bid and deduction of the price associated with the first bid from the current total bid price parameter. For example, if the budget parameter was "$3000" and the current total bid price parameter was "$2500," a non-selected bid with a price of "$600" may be disabled for selection. However, if a selected bid with a price of "$500" was un-selected, the current total bid price parameter may be updated to "$2000." The non-selected bid with a price of "$600" may then be enabled for selection based on the price of the bid no longer exceeding the difference between the current total bid price and the budget parameter. Additionally or alternatively, the user may manually override disabling non-selected bids that exceed the difference between the current total bid price and the budget parameter.

Additionally or alternatively, the user may send a message to the first contributor associated with the first bid. The message may comprise a counter-offer to the first contributor's bid. For example, if the first bid had a price of "$900," the user may message the first contributor to counter-offer for "$700" instead. The first contributor may or may not accept the counter-offer.

In Step 495, the first work request may be assigned, e.g. awarded, to the first contributor associated with the first bid. Assigning, e.g. awarding, the first work request may comprise a notification to the first contributor that the first bid had been accepted. The first contributor may then draft a first article based on the first work request. Additionally or alternatively, one or more selected bids corresponding to one or more work requests may be assigned at the same time, wherein each work request is assigned to a contributor associated with a corresponding bid. Assigning, e.g. awarding, the first work request may prevent additional bids for the first work request from being selected. Additionally or alternatively, the first work request may be assigned, e.g. awarded, to one or more contributors based on one or more bids.

FIGS. 5-14 depict examples of user interfaces by which a user may enact steps from FIG. 2, FIG. 3, and/or FIG. 4. The examples depicted in FIG. 5-14 may be incorporated into one or more applications. The one or more applications may be hosted on a server similar to server 103 in FIG. 1A and/or displayed via a computing device similar to computing device 107, 109 in FIG. 1A. A user interacting with the user interfaces as depicted in FIG. 5-14 may be able to navigate back and forth between the user interfaces.

FIG. 5 depicts an example of a user interface where a user may configure parameters related to generating the SEO optimized work request in accordance with one or more illustrative aspects described herein. The user interface may allow a user to input one or more prompt parameters, such as the target entity parameter as described with respect to Step 200 in FIG. 2. The user interface may also allow the user to input a parameter identifying a work request plan among one or more work request plans associated with the same target entity.

Figure 6:
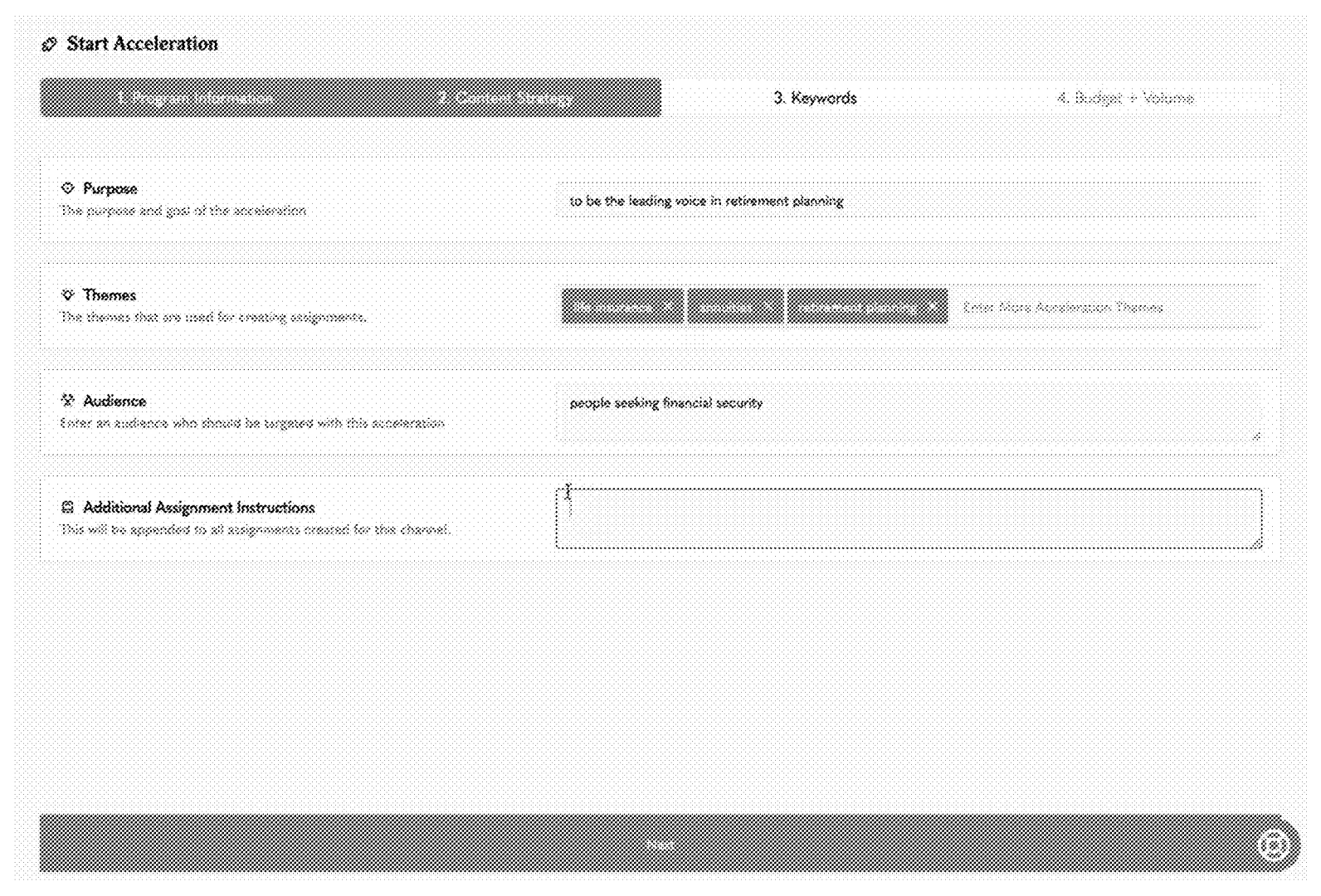

FIG. 6 depicts an example of a user interface where a user may further configure parameters related to generating the SEO optimized work request in accordance with one or more illustrative aspects described herein. The user interface may allow a user to input one or more prompt parameters, such as a purpose parameter, one or more theme parameters, one or more audience parameters, and/or additional prompt parameters. The purpose parameter, one or more theme parameters, one or more audience parameters, and/or additional prompt parameters may be similar to the similarly named prompt parameters described with respect to Step 200 in FIG. 2. Additionally or alternatively, the user may be able to edit one or more of the purpose parameter, one or more theme parameters, one or more audience parameters, and/or additional parameters.

Figure 7:
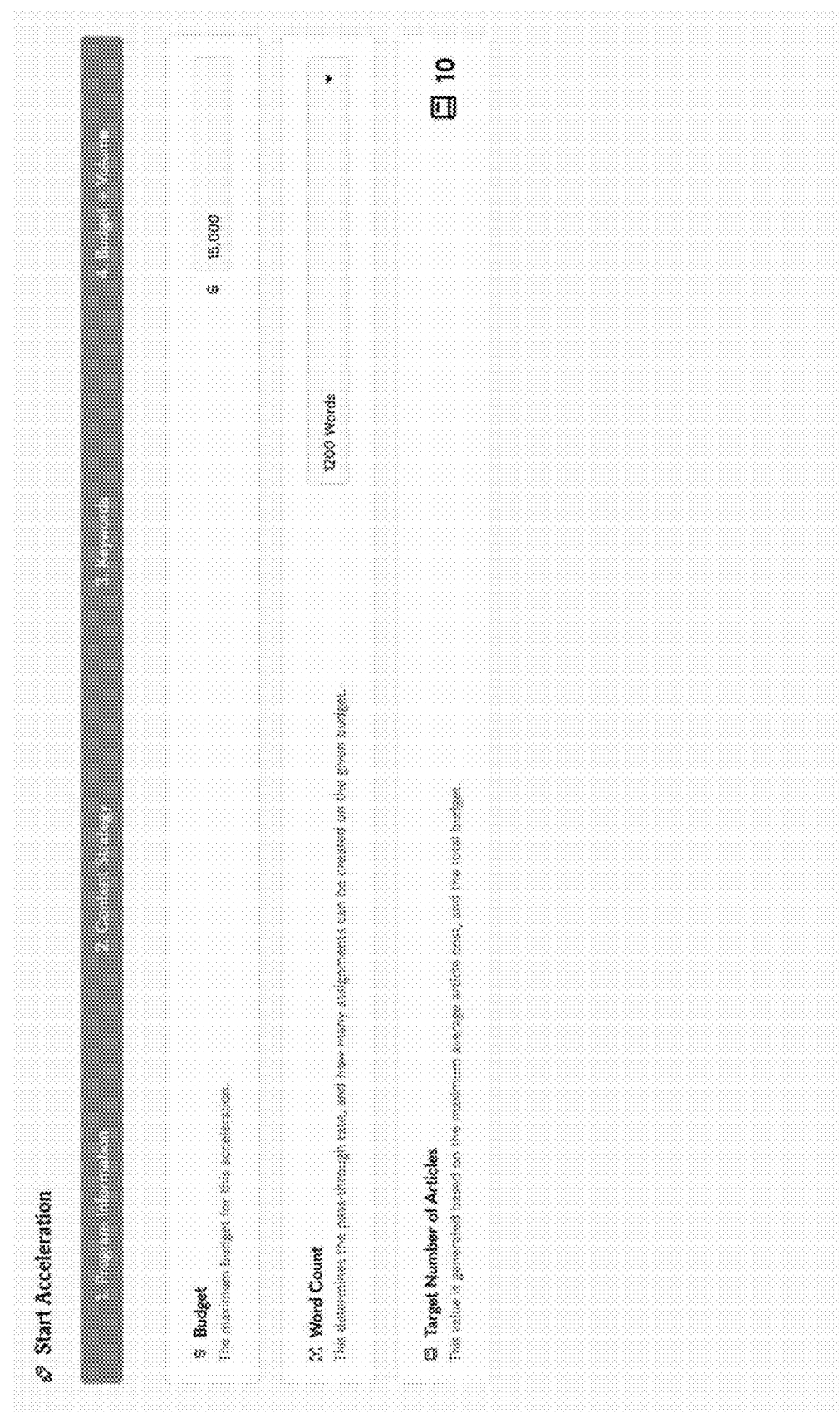
FIG. 7 depicts an example of a user interface where a user may configure parameters for a keyword query in accordance with one or more illustrative aspects described herein.

FIG. 7 depicts an example of a user interface where a user may configure parameters for a keyword query in accordance with one or more illustrative aspects described herein. FIG. 7 may depict a user interface similar that described with respect to Step 200 in FIG. 2. The user interface may allow a user to input one or more prompt parameters, such as a budget parameter and/or a word count parameter. The budget parameter and word count parameter may be similar to the budget parameter and word count parameter described with respect to Step 200 in FIG. 2. In this example, the article number parameter may be calculated, based on the budget parameter and the word count parameter, by the application for which the user interface allows for input and/or modification of parameters. Additionally or alternatively, the article number parameter may also be inputted by a user.

FIG. 8 depicts an example of a user interface where a user may further configure the keyword query in accordance with one or more illustrative aspects described herein. The user interface depicted in FIG. 8 may be similar to that described with respect to Step 205 in FIG. 2. The user interface may allow a user to input and/or edit one or more keyword query parameters, such as a search term parameter, search type parameter, and/or additional parameters. In the example depicted by FIG. 8, the user may have selected "industry acceleration" as the search type parameter, as indicated by "Industry Acceleration" in the upper left. Additionally or alternatively, the user may be able to edit the search term parameter by clicking on the "Change Acceleration Type" button in the upper right and clicking on buttons indicating "manual acceleration" or "trending acceleration" to set the search type parameter to "manual acceleration" or "trending acceleration" respectively.

In the example depicted by FIG. 8, the user may be able to input one or more comparison URL parameters by typing the URL for a comparison entity into the "Competitors/Media Properties" text box. The user may be able to add a URL by clicking the "+Add URL" button on the right side. The user may also be able to edit and/or remove previously added comparison URL parameters. In the example depicted by FIG. 8, the number of comparison URL parameters may be limited to four values; other examples may have different or no maximum comparison URL parameters.

In the example depicted by FIG. 8, the user may also select a search intent parameter as represented by the radio buttons labeled "commercial," "informational," "navigational," and "transactional." In this example, the user may only be able to select one search type parameter per keyword query; in other examples, the user may be able to select one or more search type parameters. Additionally or alternatively, the search type parameters may be represented through different classifications.

Figure 9:
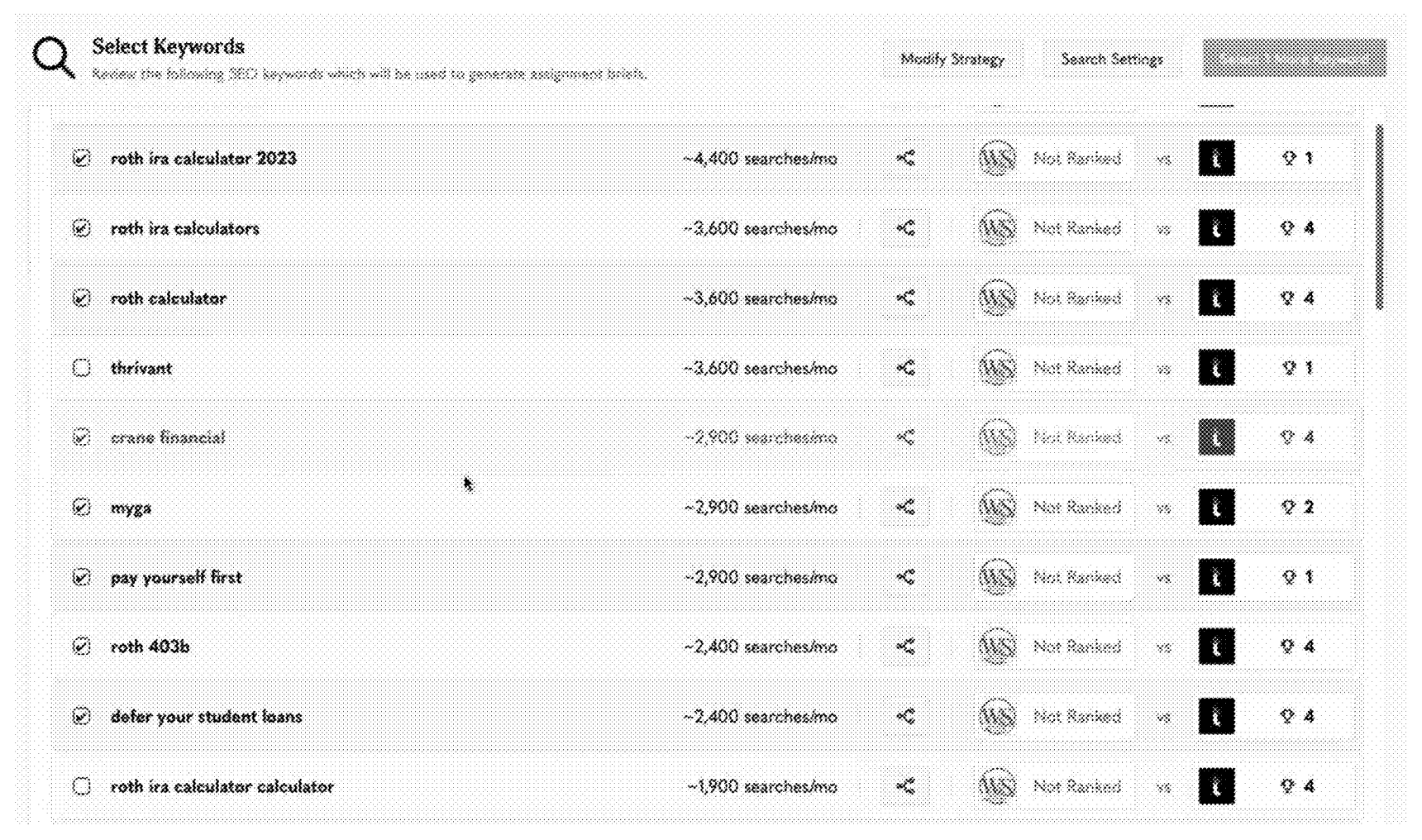

FIG. 9 depicts an example of a user interface displaying results of the keyword query in accordance with one or more illustrative aspects described herein. The user interface depicted in FIG. 9 may be similar to described with respect to Step 225 in FIG. 2. The user interface may be displayed on a computing device similar to computing device 107, 109 in FIG. 1A. The user interface may display a list of keywords, wherein each keyword may be displayed alongside an approximate number of searches per month and/or a rank corresponding to the target entity's rank in consumer searches for that keyword. Ranks may be limited to the top 100 results on an SERP for each keyword; results not appearing in the top 100 may be displayed as "not ranked." Each keyword may also be displayed with additional information based on the keyword query parameters. Each keyword may be displayed with a checkbox indicating whether a keyword is selected. The user may check or uncheck a keyword to indicate one or more keywords to be targeted with a work request. Reviewing the keyword results may improve the efficacy of the work requests by ensuring that work requests are constructed for keywords that meet the purpose and one or more theme parameters. For example, as displayed in FIG. 9, a user may uncheck "thrivant" because "thrivant" may refer to a comparison URL parameter, "www.thrivant.com", which would be a very difficult keyword for the target entity to surpass in rank.

The "modify strategy" button may be used to reconfigure the keyword query parameters, such as in the example depicted in FIG. 8. In the example depicted in FIG. 9, the search type parameter may have been set to "industry acceleration," wherein the keyword query was configured to retrieve one or more comparison URL's rank alongside the target entity rank. By selecting one or more different parameters, including but not limited to a different search type and/or search intent parameter, the user may be able to reconfigure the keyword query and rerun the keyword query for updated results. For example, if the keyword query is sent over network 101 to a database 129 and/or 131, a reconfigured keyword query with one or more updated parameters may be sent from computing device 103, 105, 107, 109 to database 129 and/or 131, results from the keyword query received by computing device 103, 105, 107, 109 over network 101, and the results displayed through the user interface as depicted in FIG. 9.

The "Search Settings" button may be used to configure one or more filter parameters on the results of the keyword query without requesting a new keyword query against database 129 and/or 131. For example, the filter parameters may be used to modify display of results that have been temporarily stored in the Document Object Model (DOM) of a browser displaying the user interface. This may allow a user to organize display of the results without incurring the time or financial cost of sending a new keyword query across network 101 to database 129 and/or 131.

The filter parameters may comprise, but are not limited to: keyword exclusion parameter, difficulty range parameter, minimum average hits parameter, and/or others. The filter parameters may be similar to those described with respect to Step 215 in FIG. 2.

The "Select 1 Keyword" button may refer to the maximum number of keywords to select to generate work requests. For example, if the article number parameter was 10 and each article corresponded to a different keyword, the user may select 10 keywords to ensure that 10 articles may be drafted. Additionally or alternatively, the user may be able to select any number of keywords between one and the article number parameter, inclusive of each end of the range. For example, if the article number parameter was 10, the user would be able to select up to and equaling 10 keywords to generate work requests, but may be able to select as few as 1 keyword. Additionally or alternative, the user may be able to modify the article number parameter by modifying one or more of the budget parameter and/or word count parameter.

FIG. 10 depicts an example of a user interface further displaying results of the keyword query in accordance with one or more illustrative aspects described herein. The user may choose to have first related keywords displayed for a first keyword while selecting keywords in a process to that discussed with respect to Step 225 in FIG. 2. The user may select to have the first related keywords displayed for the first keyword by clicking on a button indicating that first related keywords are available for the first keyword. The user interface may display related keywords with a visual indent and/or other distinction to show that the first related keywords are related to the first keyword. The user may further select one or more of the first related keywords to generate work requests, similar to the process described for selecting a first keyword in Step 225 in FIG. 2.

FIG. 11 depicts an example of a user interface displaying one or more work requests associated with one or more selected keywords in accordance with one or more illustrative aspects described herein. The user interface depicted in FIG. 11 may be similar to described with respect to Step 275 in FIG. 2, Step 375 in FIG. 3, and/or Step 475 in FIG. 4. The work requests may be displayed with a corresponding keyword to easily review which work request corresponds with which keyword. The user may decide to regenerate a work request by clicking on the "Regenerate" button associated with the work request, similar to Steps 380-385 in FIG. 3. The user may also be able to delete a work request and a corresponding keyword by clicking on the "Delete" button associated with the work request.

The user may be able to view and/or edit a work request manually by clicking on an "Assignment" button associated with the work request. An "Assignment" button may bring the user to a user interface similar to that depicted in FIG. 12. A "Contributor Keywords" button may bring the user to a user interface similar to depicted in FIG. 13. A "Contributors" button may bring the user to a user interface similar to that depicted in FIG. 14.

FIG. 12 is an illustrative example of a user interface by which the user may view and/or edit a work request. The work request may have been constructed as described with respect to steps 235-265 as described with respect to FIG. 2, wherein a first and second prompt are constructed, a first output received from a first LLM based on the first prompt, a second output received from a second LLM based on the second prompt, and the first work request constructed from the first and second outputs.

FIG. 13 is an illustrative example of a user interface displaying a first set of contributor keywords, which may be used to select a first set of contributors to release work requests to. The user interface depicted in FIG. 13 may be similar to the interface described with respect to Step 485 in FIG. 4. The user may be able to click on a contributor keyword to remove the contributor keyword from the first set of contributor keywords. As depicted in FIG. 13, a contributor keyword may be highlighted differently when the user hovers over the contributor keyword to indicate that the contributor keyword may be able to be removed from the first set of contributor keywords. Contributor keywords may also be displayed with a corresponding number of contributors, where the corresponding number of contributors is calculated based on a number of contributors associated with the contributor keyword, e.g., in the second set of contributor keywords as described in Step 487 in FIG. 4. Additionally or alternatively, the user may be able to regenerate the first set of contributor keywords.

FIG. 14 is an illustrative example of a user interface displaying a first set of contributors. The user interface depicted in FIG. 14 may be similar to the user interface described with respect to Step 487 in FIG. 4. A first contributor may have a set of one or more contributor keywords associated with the first contributor, e.g., the second set of contributor keywords, which may be displayed in association with the first contributor. Additionally or alternatively, a first contributor may be displayed with one or more contributor keywords which are both associated with the first contributor and are in the first set of contributor keywords. Additionally or alternatively, a contributor keyword which is identical to a selected keyword may be visually distinct to indicate that the first contributor has drafted articles on the selected keyword before. The user may also be able to view the first contributor's bio and/or one or more prior articles drafted by the first contributor via the "View Details" button. The one or more prior articles may be displayed with corresponding sets of contributor keywords, as described with respect to Step 487 in FIG. 4.

Work requests generated through one or more of the steps described above may be used by contributors to draft articles. Articles may refer to an article, blog post, discussions, and/or other types of primarily text-based content. Additionally or alternatively, work requests may be used to draft different types of content, such as images, videos, podcasts, and/or others.

Additionally or alternatively, articles may be audited to determine one or more modifications that may improve SEO performance. Articles audited may or may not have been based work requests generated via methods similar to those described above with respect to FIG. 2-4. Auditing may allow for a user to determine a rank for articles intended to improve SEO performance for a selected keyword and one or more modifications that may further improve SEO performance for that selected keyword.

Figure 15:
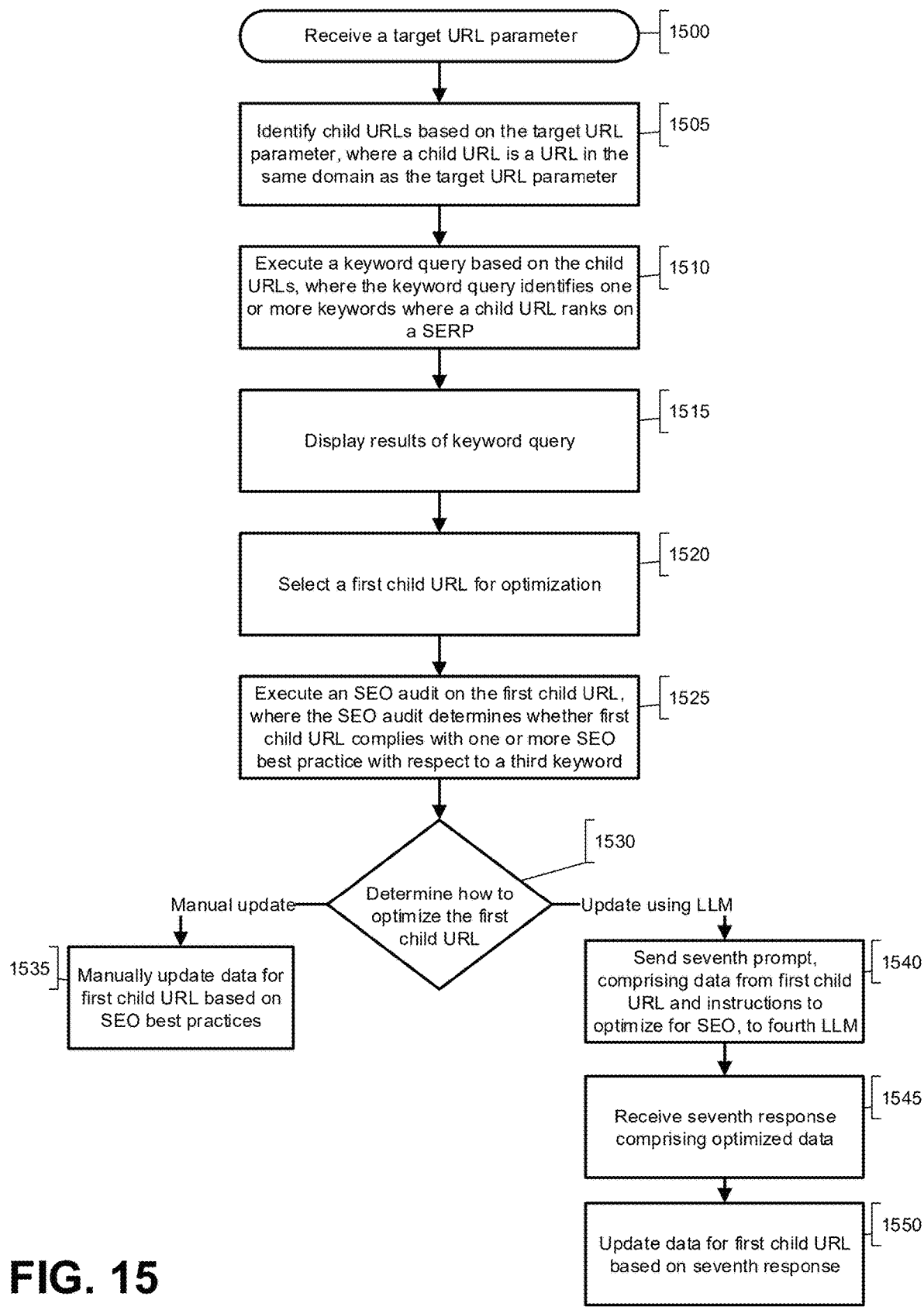
FIG. 15 depicts a flowchart for a method for a user to audit SEO performance of URLs in accordance with one or more illustrative aspects described herein.

FIG. 15 depicts a flowchart illustrating an example of a workflow for auditing performance of an article with respect to SEO. Articles may be drafted based on work requests generated through the methods described with respect to FIGS. 2-4. The workflow depicted in FIG. 15 may be performed by a user via a user interface displayed on a computing device similar to computing device 107, 109 as described in FIG. 1A. The user interface may be similar to the one or more user interfaces described with respect to FIGS. 16-21.

In Step 1500, a user may input a target URL parameter for which to audit SEO performance. The user may input the target URL parameter via a user interface, which may be similar to the user interface depicted in FIG. 16. The target URL parameter may comprise a domain owned and/or operated by a target entity. "Domain" may refer to a domain or a subdomain. For example, the target URL parameters may comprise "companyA.com," including every URL beginning with "companyA.com/[URL]," or the target URL parameter may comprise "companyA.com/blog," Additionally or alternatively, the user may input a target entity parameter corresponding to a target entity, where the target entity parameter and target entity may be similar to the target entity parameter and target entity described with respect to Step 200 in FIG. 2. The target URL parameter may allow a user to audit an entire website or one or more sections within a website when looking to improve SEO performance. A target URL parameter referencing a subdomain may reduce query costs by focusing only on the subset of URLs for SEO performance auditing. For example, the target URL parameter may represent a subdomain corresponding to a new product or service that the target entity is launching, and the target entity may want to audit SEO only for pages corresponding to the new product or service. Additionally or alternatively, if a product or service has been recently suffering in sales, the target entity may want to specifically target URLs related to that product or service as part of a plan to improve sales.

Additionally or alternatively, the user may input an identifier parameter for identifying an audit process for a target entity. The identifier parameter may allow for a user to manage multiple audit processes for a target entity, wherein each audit process may focus on different domains associated with the target entity. The identifier parameter may also further allow for comparison between audit processes to compare SEO performance over different domains associated with the target entity.

Additionally or alternatively, the user may input one or more excluded keyword parameters, where an excluded keyword parameter comprises keywords to exclude from a keyword query for URLs within the domain for the target URL parameter. For example, if auditing SEO performance for URLs within "companyA.com," the user may want to exclude the names of Company A's competitors because "companyA.com" is not likely to be able to rank highly in searches where a competitor's name is the keyword and/or improving rank in those searches is not an efficient use of Company A's resources. Additionally or alternatively, a target entity may wish to rank highly for searches where a keyword refers to other entities in the same industry and/or field. For example, a target entity which compares products between entities in the same field, such as different financial companies offering Roth IRA accounts, may still wish to rank highly for searches for the name of a financial company. Additionally or alternatively, a target entity may collect a commission from third parties for links out to third parties from the target entity website. For this example, the target entity may wish to rank highly for keywords including name of the third parties linked on the target entity's website to be able to collect more commissions for those third parties.

In Step 1505, child URLs may be identified based on the target URL parameter. As discussed above, the target URL parameter may represent a domain and/or subdomain. A child URL may be a URL for a page within the domain represented by the target URL parameter. For example, if a target entity has a blog under the target URL of "companyA.com/blog," child URLs may comprise "companyA.com/blog/1," "companyA.com/blog/2," "companyA.com/blog/3," and so forth.

In Step 1510, a second keyword query may be executed based on the child URLs. The second keyword query may be executed in a similar manner as the first keyword query as described with respect to Step 215 in FIG. 2. For example, the second keyword query may be sent over network 101 to a third party performing keyword analysis services, such as SEMRush, Ahrers, Google Keyword Planner, and/or others, and results of the second keyword query received by computing device 107, 109 over network 101. The second keyword query may be constructed to return a list, for each child URL, of one or more keywords and a rank in a search engine results page (SERP) of the child URL for each keyword in the list. The second keyword query may be configured to only return a keyword where a child URL's rank is above a certain level for keyword. For example, a maximum rank may be set at "100," where "1" would represent the first result on the SERP.

In Step 1515, results of the second keyword query may be displayed to a user interface. The user interface may be displayed on a computing device similar to computing device 107, 109 in FIG. 1A. The user interface may be similar to that depicted with respect to FIG. 17. The user interface may display a child URL, one or more keywords for which the child URL ranks on, and/or a rank corresponding with each keyword in the one or more keywords. The user interface may also display an average number of searches per month for each keyword, similar to the average number of searches per month parameter as described with respect to Step 215 in FIG. 2.

In Step 1520, the user may select a first child URL to audit for SEO performance. The user may select a first child URL based on a first rank of the first child URL corresponding to a first keyword. For example, the first child URL may be a good selection for SEO auditing because the first child URL ranks in the top 20 for a keyword with several thousand average searches per month, indicating that improving rank for that keyword would have a substantial impact on traffic to the child URL and the target entity. Additionally or alternatively, the user may select one or more child URLs to audit simultaneously.

Appropriate ranks and average number searches per month for SEO auditing may vary depending on characteristics of the target entity. For example, a target entity new to an industry and/or field may choose to improve SEO performance for keywords with lower numbers of average searches per month to establish domain authority before targeting keywords with higher average searches per month. Additionally or alternatively, a target entity with high domain authority may target keywords with high average searches per month, even if the child URL ranks lower for those keywords.

In Step 1525, an SEO audit may be executed on data from the first child URL and a third keyword. Data from the first child URL may be scraped from the live page associated with the first child URL. The third keyword may be selected from the one or more keywords that the first child URL ranked on, as identified and/or displayed in Step 1515. The third keyword may be selected based factors comprising, but not limited to: the keyword with the highest rank for the first child URL, the keyword with the highest average searches per month, the keyword representing the lowest difficulty for improving rank, and/or additional factors.

The SEO audit may determine, based on data from the first child URL and the third keyword, whether the first child URL is compliant with one or more SEO best practices. An SEO best practice may comprise guidelines for use and placement of keywords for optimization, usage of Hypertext Markup Language (HTML) tags, usage of metadata, and/or additional guidelines. One or more SEO best practices may be identified and stored in memory by the user before executing the SEO audit. "Complying" with an SEO best practice may indicate that the first child URL implements the SEO best practice for the third keyword. Additionally or alternatively, one or more SEO best practices may be provided by a third party, such as a keyword analysis group like SEMRush, an owner and/or operator of a search engine like Google, and/or others.

The SEO audit may determine, for the third keyword and one or more SEO best practices, whether data from the first child URL meets criteria for an SEO best practice. If the data from the first child URL does not comply with an SEO best practice, the SEO audit may identify one or more modifications necessary to meet criteria for that SEO best practice. For example, a first SEO best practice may be ensuring that the third keyword appears in a "<h1>" HTML tag on the first child URL. In this example, data from the first child URL may not have the third keyword in an "<h1>" tag. The SEO audit may determine that the first child URL does not comply with the first SEO best practice, and may further determine one or more modifications necessary to comply with the first SEO best practice. Results of the SEO audit may be displayed to a user interface, which may be displayed on computing device 107, 109. The user interface may be similar to the user interface depicted in FIG. 18.

The SEO audit may be performed by computing device 107, 109. Additionally or alternatively, an API request for the SEO audit, where the API request may comprise at least data from the first child URL may be sent over network 101 to an API endpoint hosted on computing device 103, 105. Results of the SEO audit may further comprise an "SEO Score," wherein the SEO score represents an indication of how many SEO best practices the first child URL currently complies with. Determining the SEO score may comprise calculating a percentage indicating a number of SEO best practices that the first child URL complies with compared to a total number of SEO best practices. An SEO best practice may be weighted to have a larger or smaller impact on the SEO score based on the relative importance of that SEO best practice to SEO performance. Additionally or alternatively, the SEO audit may determine that the first child URL complies with all known SEO best practices.

Additionally or alternatively, the user may be able to select a fourth keyword to audit SEO performance for. This may allow the user to select a fourth keyword with a higher average search per month to optimize the first child URL for instead of the first keyword. The fourth keyword may be a related keyword to the third keyword, similar to the related keywords described with respect to Step 215 in FIG. 2. The user may be able to view and/or select a fourth keyword via a user interface similar to the user interface depicted in FIG. 19. The user may be able to execute the SEO audit for the first child URL based on the fourth keyword. In this example, the SEO audit would determine whether the first child URL complied with SEO best practices with respect to the fourth keyword instead of, or in addition to, the third keyword as described above. This step may allow a user to quickly re-configure the first child URL for a fourth keyword related to third keyword, but with a higher average number of searches per month, without having to draft new content.

In Step 1530, the user may determine how to optimize the first child URL for SEO. The user may determine how to optimize the first child URL based on at least one of the SEO score or the one or more SEO best practices. The SEO score, one or more SEO best practices, and/or one or more modifications for complying with an SEO best practice may be displayed to a user interface, which may be similar to the user interface depicted in FIG. 18. The user may determine to manually optimize the first child URL based on a small number of modifications, indicating that the first child URL complies with a high number of the SEO best practices. Additionally or alternatively, the user may determine to optimize the first child URL using a fourth LLM. The user may decide to optimize the first child URL using a fourth LLM based on a large number of modifications, which may be represented as a low SEO score.

Additionally or alternatively, the user may view a detailed display of the SEO score and/or one or modifications as part of determining how to optimize the first child URL. Display of the SEO score and/or one or more modifications may be via a user interface, which may be similar to the user interface depicted in FIG. 20.

In Step 1535, the user may manually update data from the first child URL with one or more modifications to optimize the first child URL for SEO. The user may manually update text, field, HTML tags, metadata, and/or other components saved in the DOM for the first child URL. The user may manually update data from the first child URL via a user interface, which may be similar to the user interface depicted in FIG. 21.

In Step 1540, the user may choose to optimize the first child URL by using the fourth LLM and send a seventh prompt to the fourth LLM. The fourth LLM may be selected based on factors comprising, but not limited to, speed, ability to process instructions for web page improvements, ability to output functional code and/or HTML tags, live connection to a search engine, privacy, data security, and/or other factors. The fourth LLM may be similar to the first LLM and/or second LLM. The fourth LLM may be GPT 4.0 because GPT 4.0 reliably outputs responses implementing the specified instructions in the seventh prompt, thereby reducing the amount of time necessary to optimize the first child URL.

The seventh prompt may be constructed based on a seventh master prompt using methods similar to those discussed with respect to the first prompt and first master prompt. The seventh master prompt may comprise instructions to optimize data from a child URL for SEO based on a keyword and one or more modifications identified by the SEO audit. The seventh master prompt may be a string comprising instructions and one or more placeholders for data from the first child URL, one or more modifications, the third keyword, and/or additional parameters. The one or more modifications may be similar to those determined by the SEO audit in Step 1525. The seventh prompt may be sent to the fourth LLM as an API request from computing device 107, 109 over network 101.

Additionally or alternatively, the user may identify the one or more modifications based on an eighth output from an eighth prompt to a fifth LLM. The fifth LLM may be selected based on factors comprising, but not limited to, speed, ability to process instructions for web page improvements, ability to output functional code and/or HTML tags, live connection to a search engine, privacy, data security, and/or other factors. The fifth LLM may be similar to the first LLM, second LLM, and/or third LLM. The fifth LLM may be Google AI Gemini because Google AI Gemini can initiate searches for keywords on Google and process live results from a search, ensuring that the one or more modifications are based on current high ranking results for the third keyword.

The eighth prompt may be constructed from an eighth master prompt using methods similar to those discussed with respect to the first prompt and first master prompt. The eighth master prompt may comprise instructions to perform a search for a keyword, analyze a number of top ranked results in the SERP, and generate further instructions on how to optimize a child URL for SEO based on the top ranked results. The eighth master prompt may be a string comprising instructions and a placeholder for the third keyword. Additionally or alternatively, the eighth master prompt may comprise one or more additional placeholders for additional parameters. The eighth prompt may not use data from the first child URL based on the fifth LLM not supporting confidential information. The eighth prompt may also be limited to requesting a list of modifications, rather than directing the fifth LLM to implement the modifications similar to the seventh prompt and fourth LLM, due to limitations of the fifth LLM.

The eighth output may comprise one or more modifications that, when implemented for the first child URL, may improve the first child URL's performance for the third keyword. In this example, the user may construct the eighth prompt wherein the placeholder for the one or more modifications in the eighth master prompt may be updated with the one or more modifications received in the eighth output. The eighth output may then be used as one or more parameters for the one or modifications incorporated into the seventh prompt as part of Step 1540, by which data from the first child URL is optimized according to the one or more modifications.

In Step 1545, a seventh response from the fourth LLM based on the seventh prompt may be received. The seventh response may be a response to an API request comprising the seventh prompt and received by computing device 107, 109 over network 101 from the fourth LLM. The seventh response may comprise optimized data to replace data from the first child URL. Optimized data may comprise data where one or more modifications have been implemented, wherein the one or more modifications may be similar to those discussed with respect to Step 1530.

In Step 1550, the data for the first child URL may be updated with the optimized data from the seventh response. Additionally or alternatively, the user may choose to re-send the seventh prompt as in Step 1540 if an SEO audit on the optimized data from the seventh response determines one or more further modifications to improve SEO performance.

Additionally or alternatively, Step 1550 may be followed by Step 1530 and Step 1535. The user may determine that one or more modifications may further optimize the first child URL, similar to Step 1530. The user may manually update the optimized data for the first child URL based on the one or more modifications similar to Step 1535.

Steps 1535 and 1550 may be followed by saving the optimized data for the first child URL. The optimized data for the first child URL may be exported into one or more formats and sent to the target entity from computing device 107, 109 over network 101 to the target entity for implementation on the first child URL. Additionally or alternatively, the user may optimize one or more child URLs at a time, and may send exports comprising optimized data for each child URL to the target entity.

FIGS. 16-21 depict examples of user interfaces by which a user may enact steps from FIG. 15. The examples depicted in FIG. 16-21 may be incorporated into one or more applications. The one or more applications may be hosted on a server similar to server 103 in FIG. 1A and/or displayed via a computing device similar to computing device 107, 109 in FIG. 1A. The one or more applications may also be similar to the one or more applications described with respect to FIGS. 5-14. A user interacting with the user interfaces as depicted in FIG. 16-21 may be able to navigate back and forth between the user interfaces.

Figure 16:
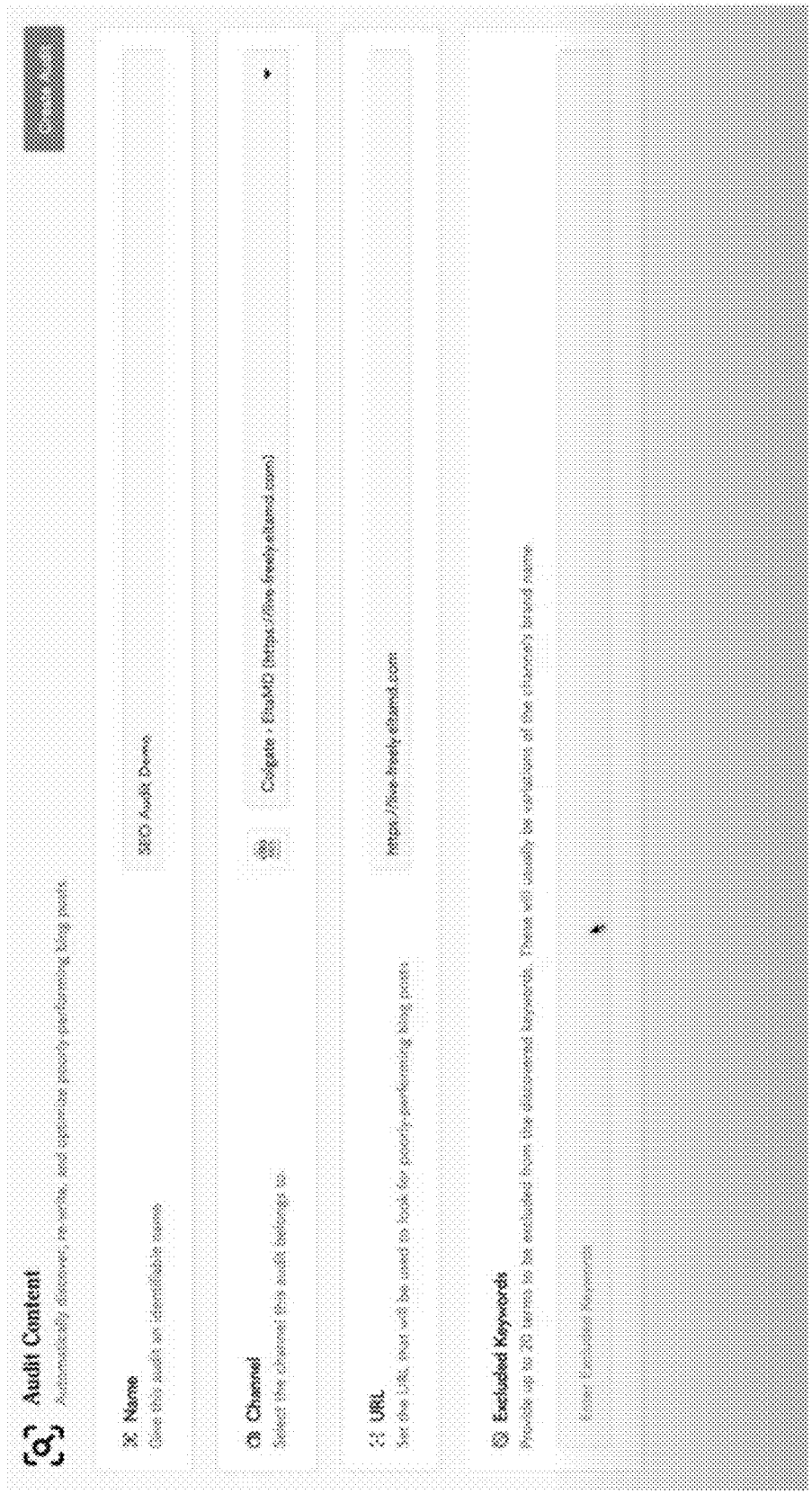
FIG. 16 depicts an example of a user interface where a user may configure parameters to identify URLs for auditing SEO performance in accordance with one or more illustrative aspects described herein.

FIG. 16 depicts an example of a user interface where a user may configure parameters to identify URLs for auditing SEO performance in accordance with one or more illustrative aspects described herein. The user interface may be similar to the user interface described with respect to Step 1500 in FIG. 15.

"URL" may refer to a target URL parameter, similar to the target URL parameter described with respect to Step 1500 in FIG. 15. "Channel" may refer to a target entity parameter, similar to the target entity parameter described with respect to Step 1500 in FIG. 15. "Name" may refer to an identifier parameter, similar to the identifier parameter described with respect to Step 1500 in FIG. 15. "Excluded keywords" may refer to one or more excluded keywords, which may be similar the one or more excluded keyword parameters described with respect to Step 1500 in FIG. 15. Excluded keyword parameters may be optional. The user may click on the "Create Audit" button to execute the second keyword query, which may identify child URLs and ranking keywords for those child URLs, based on the configured parameters. The "Create Audit" button may navigate the user to a user interface similar to that depicted in FIG. 17.

Figure 17:
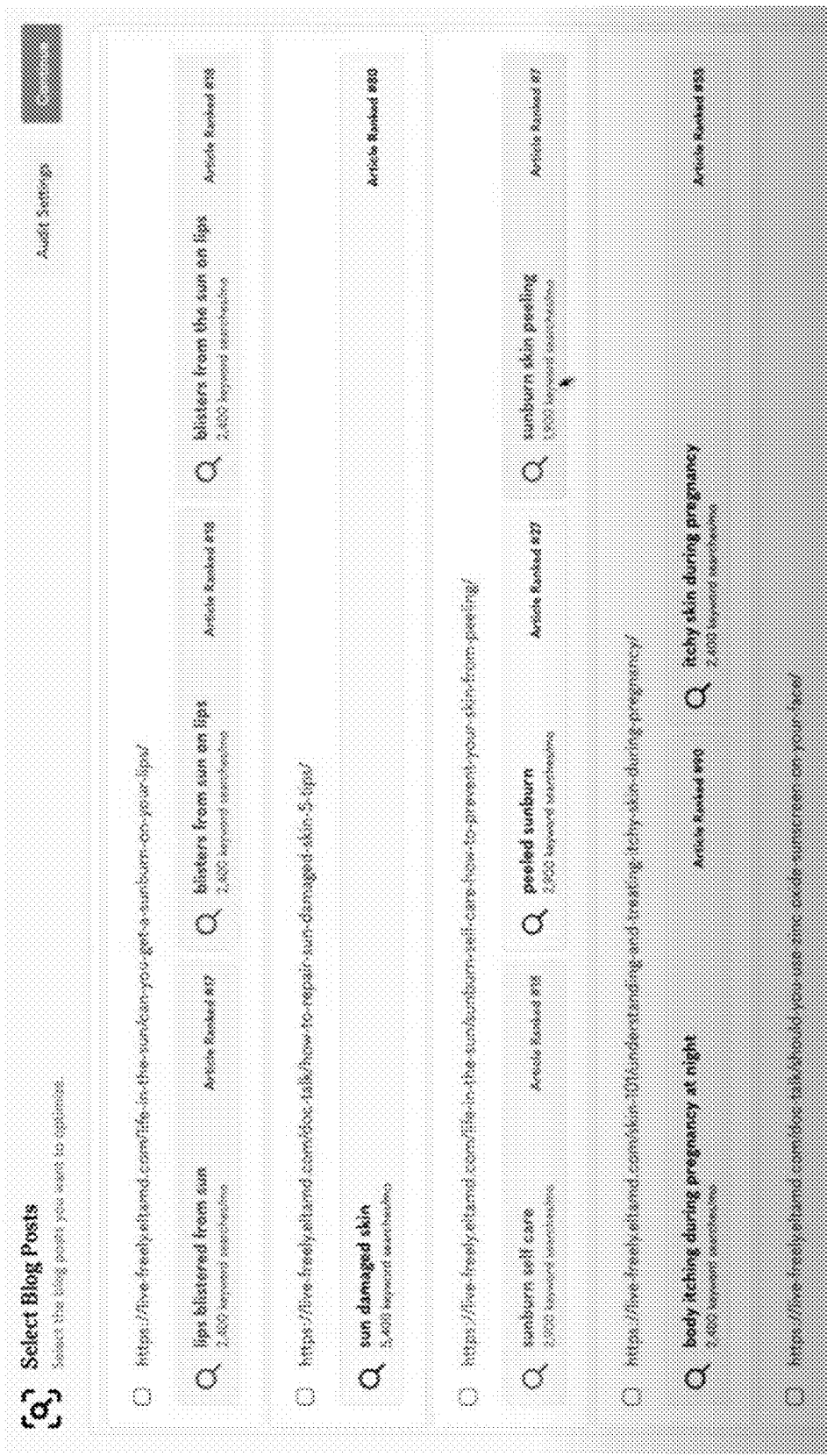
FIG. 17 depicts an example of a user interface where a user may select child URLs for auditing SEO performance in accordance with one or more illustrative aspects described herein.

FIG. 17 depicts an example of a user interface where a user may select child URLs for auditing SEO performance in accordance with one or more illustrative aspects described herein. The user interface may be similar to the user interface described with respect to Step 1515 and 1520 in FIG. 15. The user may be able to configure one or more parameters for the second keyword query by clicking on the "Audit Settings" button. The one or more parameters may be similar to those described with respect to the second keyword query in Step 1500 and 1510, such as the target URL parameter and/or one or more excluded keyword parameters.

In the example depicted in FIG. 17, child URLs may be displayed with the child URL and one or more keywords that the child URL ranks on a SERP for. Each keyword may be displayed with a rank indicating the child URL's rank on a SERP and a number indicating an average number of searches per month for the keyword. Additionally or alternatively, keywords may be highlighted in different colors to indicate when a child URL for that keyword ranks above a given threshold. For example, when a child URL ranks above a threshold of 20 for a keyword, the keyword may be highlighted yellow as depicted in FIG. 17 to provide a quick visual indication to the user of the top 20 rank. A child URL ranking above a threshold of 10 for a keyword may be indicated by the keyword being highlighted in green, also depicted in FIG. 17.

Additionally or alternatively, the user may be able to search for related keywords for each keyword. For example, as depicted in FIG. 17, the user may be able to click on a magnifying glass icon associated with a keyword to view related keywords.

The user may be able to click on a selection box associated with each child URL to select a child URL for an SEO audit. The user may be able to select or more child URLs for an SEO audit. The user may also de-select a selected child URL. The user may click on the "Continue" button to execute an SEO audit, where an SEO audit may be similar to the optimization described with respect to Step 1525 in FIG. 15. When one or more SEO audits corresponding to one or more selected child URLs are complete, the user may be navigated to an interface similar to that depicted in FIG. 18.

Figure 18:
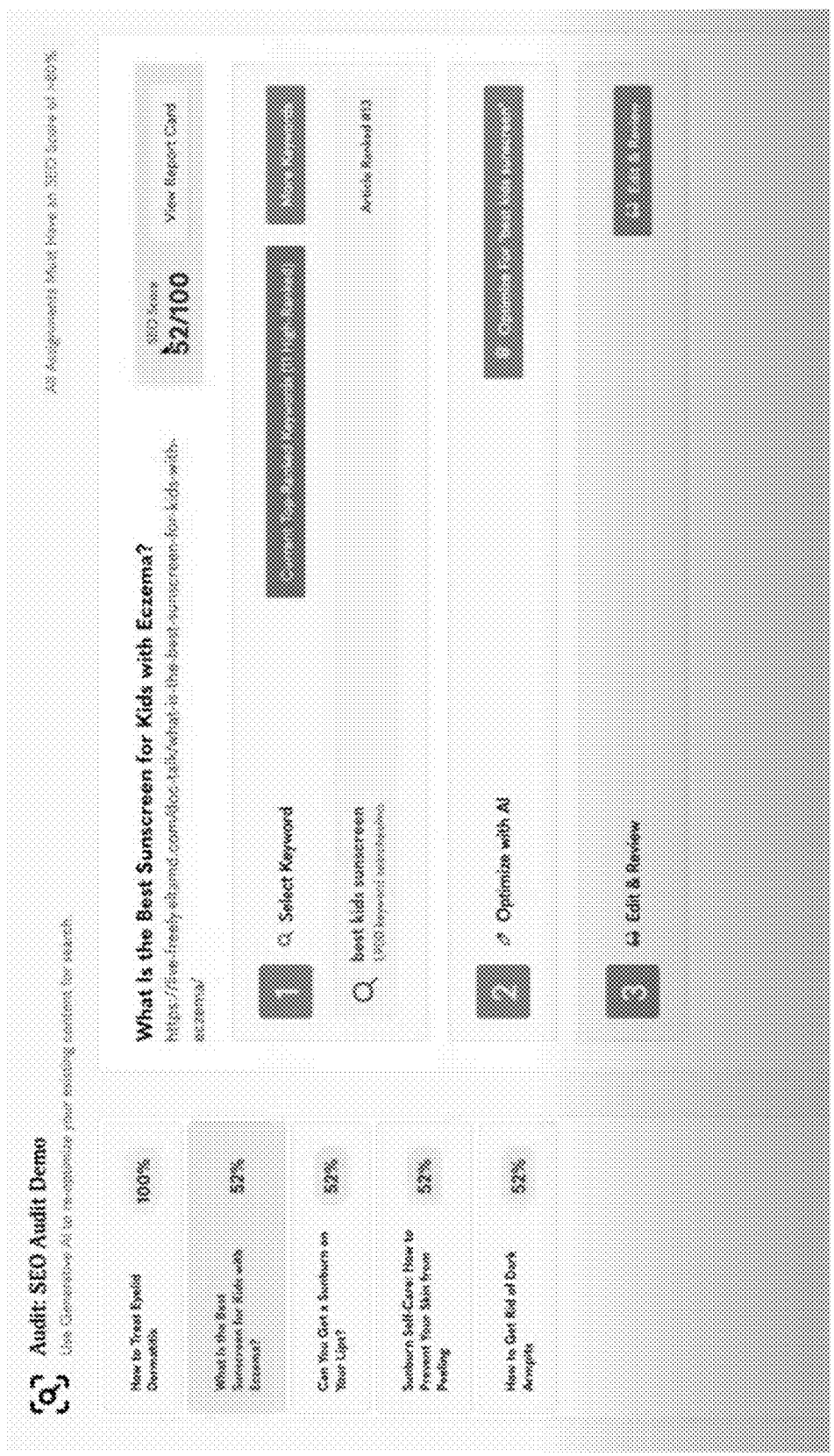
FIG. 18 depicts an example of a user interface for viewing results of an SEO audit for a child URL in accordance with one or more illustrative aspects described herein.

FIG. 18 depicts an example of a user interface for viewing results of an SEO audit for a child URL in accordance with one or more illustrative aspects described herein. The user interface may be similar to the user interface described in Step 1530 in FIG. 15. In the example depicted in FIG. 15, the user may have selected one or more child URLs for SEO audits. The one or more child URLs may be displayed in a list on the user interface for easy navigation between child URLs. A currently selected child URL, e.g. a second child URL, may be indicated by highlighting the second child URL in the list of child URLs. The second child URL may be highlighted in a color corresponding to an SEO score for the second child URL. Results of an SEO audit for the first child URL may be displayed in the user interface.

The SEO score for the second child URL may be displayed. The SEO score may be highlighted in a color to quickly indicate a relative number of SEO best practices that the second child URL currently complies with. as determined by the SEO audit. For example, when the SEO score is "96/100," representing a high number of SEO best practices that the second child URL is compliant with, the SEO score may be highlighted in green. Lower scores may be highlighted in yellow and/or red to indicate a relative number SEO best practices that the second child URL is not compliant with, as determined by the SEO audit. The user may be able to view more detailed results associated with the SEO audit by clicking on "View Report Card," which may navigate the user to a user interface similar to that depicted in FIG. 20.

Figure 19:
FIG. 19 depicts an example of a user interface for viewing related keywords associated with a child URL in accordance with one or more illustrative aspects described herein.

The third keyword, as determined by the SEO audit for the second child URL, may be displayed. Additionally or alternatively, if the user selected a fourth keyword to execute the SEO audit for the second child URL, the fourth keyword may be displayed. If the second child URL is ranking on a SERP for one or more keywords, the one or more ranking keywords may be displayed by clicking on the "Current Top-Ranked Keywords" button. The third keyword and/or fourth keyword may be included in the ranking keywords. Keywords may be displayed with a corresponding rank and/or average searches per month. Keywords may be highlighted to indicate a high rank; for example, green for top 10 or yellow for top 20. Additionally or alternatively, the user may select additional related keywords to audit the second child URL for, as depicted in FIG. 19. The user may also remove a keyword from the SEO audit. Displaying related keywords for selection may comprise sending an API request over network 101 to a third party performing keyword analysis. Additionally or alternatively, display related keywords for selection may comprise filtering results from the second keyword query, as described with respect to Steps 1510-1515 in FIG. 15 and as depicted in FIG. 16, wherein results from the second keyword have been locally cached to computing device 107, 109. Selecting an additional keyword may trigger re-execution of the SEO audit for the additional keyword.

In the example depicted in FIG. 18, Steps 1535 and Steps 1540-1545 may be indicated as part of a workflow. Steps 1540-1545 may be represented by "2" and "Optimize For 'eyelid dermatitis'" button, where the currently selected child URL is intended to improve SEO performance for keyword "eyelid dermatitis." Clicking the "Optimize for . . . " button may trigger Steps 1540-1550 from FIG. 15, wherein a seventh prompt may be sent to a fourth LLM to optimize data from the second child URL. The seventh prompt and fourth LLM may be similar to those described with respect to Step 1540 in FIG. 15. Additionally or alternatively, the seventh prompt may be sent as an asynchronous request to the fourth LLM, allowing the user to select a different child URL for display while the fourth LLM is processing and responding to seventh prompt. When a seventh response is received from the fourth LLM based on the seventh prompt, data from the corresponding child URL may be updated based on the seventh response without requiring the user to navigate back to the corresponding child URL. In this example, the SEO audit may be re-executed to determine if one or more modifications may be available with respect to the updated data for the corresponding child URL. Additionally or alternatively, a notification may be displayed to the user to indicate that a child URL has been updated based on a response from the fourth LLM.

Figure 21:
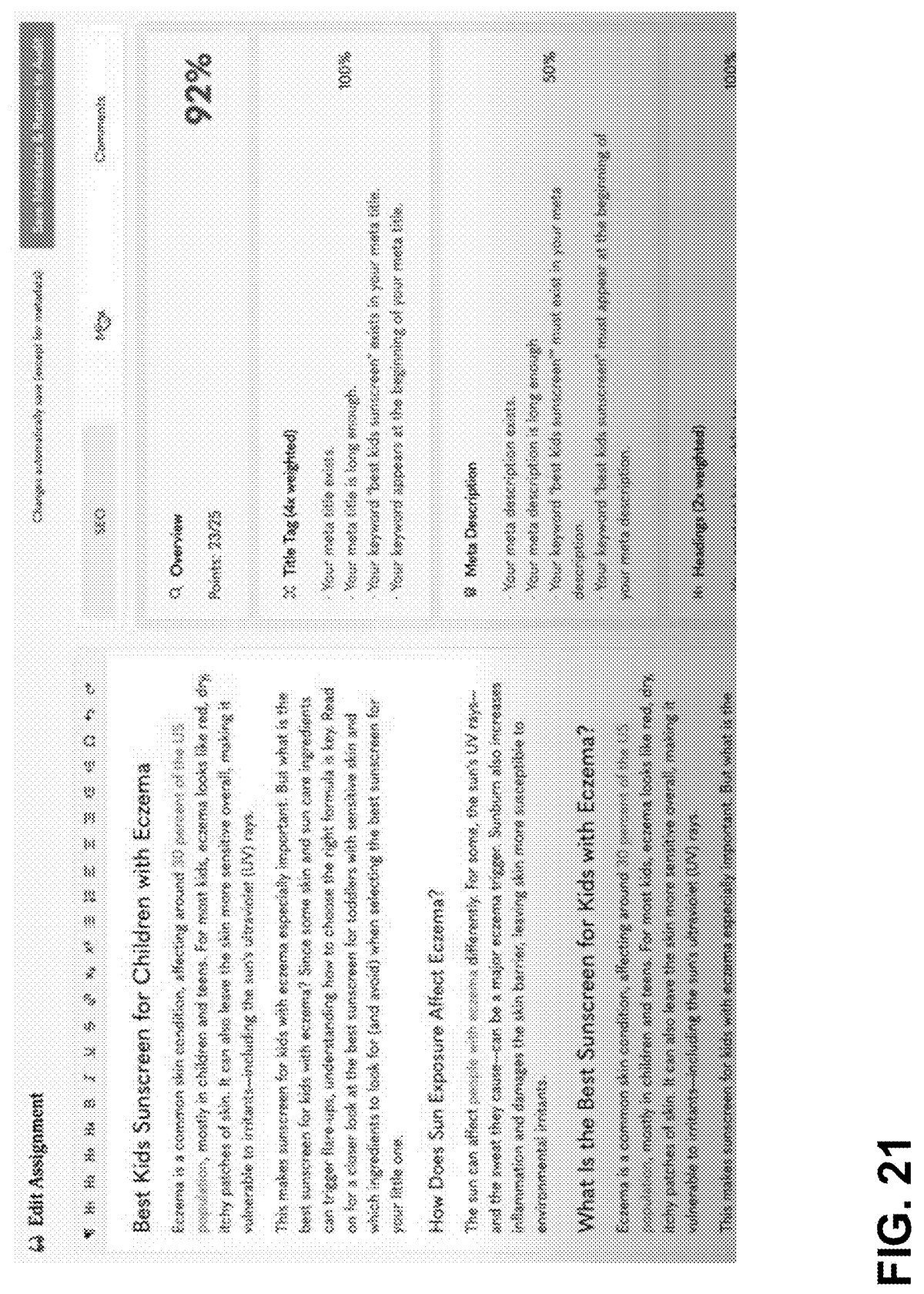

Step 1535 may be represented by "3" and "Edit & Review." Clicking the "Edit & Review" button may navigate the user to an interface similar to that depicted in FIG. 21.

FIG. 19 depicts an example of a user interface for viewing related keywords associated with a child URL in accordance with one or more illustrative aspects described herein. The user interface may be similar to the user interface described with respect to Step 1530 in FIG. 15. The user may select a fourth keyword from the related keywords to optimize the second child URL for instead of the third keyword determined by the SEO audit.

Figure 20:
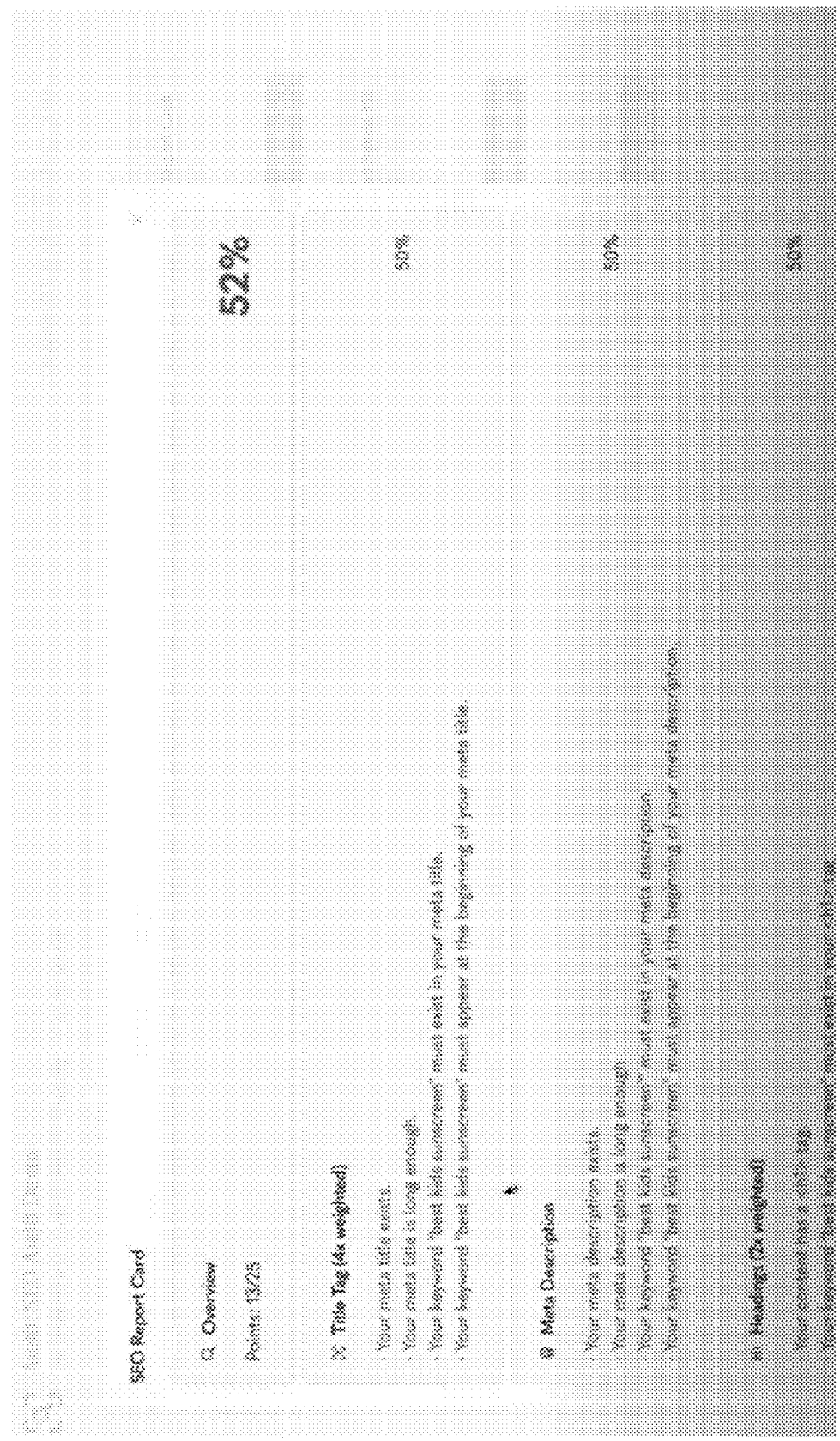
FIG. 20 depicts an example of a user interface for reviewing one or more SEO best practices for optimizing SEO performance in accordance with one or more illustrative aspects described herein.

FIG. 20 depicts an example of a user interface for reviewing one or more SEO best practices for optimizing SEO performance in accordance with one or more illustrative aspects described herein. The user interface may be similar to the user interface described with respect to Step 1525 and 1530 in FIG. 15. The user interface may display one or more SEO best practice groups, wherein one or SEO best practices in an SEO best practice group share common factors. For example, SEO best practices related to metadata for the second child URL may be displayed together, SEO best practices related to HTML headers may be displayed together, and so forth. SEO best practices and/or SEO best practice groups may be displayed with a corresponding impact upon the SEO score. SEO best practices may be displayed with one or more corresponding modifications, as determined by the SEO audit, to make to the data from the second child URL to bring the second child URL into compliance with the SEO best practice. SEO best practices may be highlighted based on whether the second child URL is compliant with the SEO best practice. For example, SEO best practices that are implemented may be highlighted in green, while SEO best practices not implemented highlighted in red, to quickly indicate to the user which SEO best practices may be implemented to improve SEO performance.

FIG. 21 depicts an example of a user interface for manually updating data from a child URL to optimize SEO performance in accordance with one or more illustrative aspects described herein. The user interface may be similar to the user interface described with respect to Step 1535 in FIG. 15. The user may be able to edit content displayed on the second child URL to implement one or more modifications to comply with one or more SEO best practices. The user may also be able to edit metadata and/or comments associated with the second child URL by clicking on the "Meta" and/or "Comments" sections.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims. Additionally or alternatively, further aspects may provide for generating versions of an article optimized for different types of social media. For example, if the target entity uploaded a 1200-word article optimized for the "roth ira" keyword, the target entity may also wish upload references to the article to social media such as Instagram, LinkedIn, TikTok, and/or others. Optimization may comprise constructing a prompt to an LLM, wherein the prompt comprises instructions to optimize the article for a specified social media domain and the text of the article. The LLM may generate a response wherein the response covers the topics of the article in a style appropriate for the specified social media. For example, if the specified social media was Instagram, the response may comprise one or more sentences summarizing the article and a link to the URL hosting the article. Additionally or alternatively, if the specified social media was TikTok, the response may comprise a script that, when read aloud, is less than one minute long, and specifies keywords to highlight in a TikTok video. Additionally or alternatively, the prompt may be modified to comprise instructions on how to optimize the article for the specified social media.

The invention claimed is:

1. A computer-implemented method for dynamically generating work requests for search engine optimization (SEO), comprising:
   receiving a target website parameter, indicating a target website for SEO, and one or more prompt parameters;
   configuring a first keyword query with one or more keyword query parameters;
   initiating the first keyword query;
   displaying, via a user interface, a result of the first keyword query, wherein the result comprises:
      a keyword, and
      a first rank, wherein the first rank indicates how highly the target website is displayed in a search engine results page for the keyword;
   receiving, via the user interface, a selection of a first keyword;
   constructing, based on the first keyword and one or more of the prompt parameters, a first prompt and a second prompt, wherein each prompt comprises an input statement for a large language model (LLM);
   receiving, from a first LLM, a first output corresponding to the first prompt;
   receiving, from a second LLM, a second output corresponding to the second prompt;
   constructing a first work request based on the first output and the second output, wherein the first work request is associated with first keyword;
   identifying one or more contributor keywords, wherein a contributor keyword indicates a topic associated with the first work request;
   selecting, based on the one or more contributor keywords, one or more contributors, wherein a contributor is associated with at least one contributor keyword;
   sending the first work request to the one or more contributors;
   receiving one or more bids from the one or more contributors, wherein a bid is associated with a contributor and comprises an offer to draft an article based on the first work request;
   selecting a first bid; and
   assigning the first work request to a first contributor associated with the first bid.

2. The method of claim 1, wherein the first output comprises instructions for a contributor to draft an article to improve a rank of the target website on a search engine results page for the first keyword.

3. The method of claim 1, wherein the second output comprises an outline for an article to improve a rank of the target website on a search engine results page for the first keyword.

4. The method of claim 1, wherein the one or more keyword query parameters comprise at least one of:
   one or more comparison website parameters, wherein a comparison website is a website different from the target website;
   a search type parameter; and
   a search intent parameter, indicating a type of information a consumer intends to learn when searching for a keyword.

5. The method of claim 4, wherein the result of the first keyword query further comprises:
   a second rank, wherein the second rank indicates how highly a comparison website is displayed in a search engine results page for the keyword.

6. The method of claim 1, wherein a contributor is associated with at least one contributor keyword based on:
   identifying, based on one or more articles by a contributor, one or more contributor keywords associated with the one or more articles.

7. The method of claim 1, herein a result further comprises:
   a search frequency, wherein the search frequency of the keyword is further based on a number of times that the keyword was searched over a given period of time.

8. The method of claim 1, wherein the first rank is further based on:

how highly the target website is displayed in the search engine results page for the keyword over a period of time.

9. A computing device configured to dynamically generate work requests for search engine optimization (SEO), the computing device comprising:
one or more processors; and
memory storing instructions that, when executed by the one or more processors, cause the computing device to:
receive a target website parameter, indicating a target website for SEO, and one or more prompt parameters;
configure a first keyword query with one or more keyword query parameters;
initiate the first keyword query;
display, via a user interface, a result of the first keyword query, wherein the result comprises:
a keyword, and
a first rank, wherein the first rank indicates how highly the target website is displayed in a search engine results page for the keyword;
receive, via the user interface, a selection of a first keyword;
construct, based on the first keyword and one or more of the prompt parameters, a first prompt and a second prompt, wherein a prompt comprises an input statement for a large language model (LLM);
receive, from a first LLM, a first output corresponding to the first prompt;
receive, from a second LLM, a second output corresponding to the second prompt;
construct a first work request based on the first output and the second output, wherein the first work request is associated with first keyword;
identify one or more contributor keywords, wherein a contributor keyword indicates a topic associated with the first work request;
select, based on the one or more contributor keywords, one or more contributors, wherein a contributor is associated with at least one contributor keyword;
send the first work request to the one or more contributors;
receive one or more bids from the one or more contributors, wherein a bid is associated with a contributor and comprises an offer to draft an article based on the first work request;
select a first bid; and
assign the first work request to a first contributor associated with the first bid.

10. The computing device of claim 9, wherein the first output comprises instructions for a contributor to draft an article to improve a rank of the target website on a search engine results page for the first keyword.

11. The computing device of claim 1, wherein the one or more keyword query parameters comprise at least one of:
one or more comparison website parameters, wherein a comparison website is a website different from the target website;
a search type parameter; and
a search intent parameter, indicating a type of information a consumer intends to learn when searching for a keyword.

12. The computing device of claim 11, wherein the result of the first keyword query further comprises:
a second rank, wherein the second rank indicates how highly a comparison website is displayed in a search engine results page for the keyword.

13. The computing device of claim 9, wherein a result further comprises:
a search frequency, wherein the search frequency of the keyword is further based on a number of times that the keyword was searched over a given period of time.

14. The computing device of claim 9, wherein the first rank is further based on:
how highly the target website is displayed in the search engine results page for the keyword over a period of time.

15. The computing device of claim 9, wherein a contributor is associated with at least one contributor keyword based on:
identify, based on one or more articles by the contributor, one or more contributor keywords associated with the one or more articles.

16. One or more non-transitory computer-readable media storing instructions for dynamically generating work requests for search engine optimization (SEO) that, when executed by one or more processors, cause a computing device to perform steps comprising:
receiving a target website parameter, indicating a target website for SEO, and one or more prompt parameters;
configuring a first keyword query with one or more keyword query parameters;
initiating the first keyword query;
displaying, via a user interface, a result of the first keyword query, wherein a result comprises:
a keyword, and
a first rank, wherein the first rank indicates how highly the target website is displayed in a search engine results page for the keyword;
receiving, via the user interface, a selection of a first keyword;
constructing, based on the first keyword and one or more of the prompt parameters, a first prompt and a second prompt, wherein a prompt is an input statement for a large language model (LLM);
receiving, from a first LLM, a first output corresponding to the first prompt;
receiving, from a second LLM, a second output corresponding to the second prompt;
constructing a first work request based on the first output and the second output, wherein the first work request is associated with first keyword;
identifying one or more contributor keywords, wherein a contributor keyword indicates a topic associated with the first work request;
selecting, based on the one or more contributor keywords, one or more contributors, wherein a contributor is associated with at least one contributor keyword;
sending the first work request to the one or more contributors;
receiving one or more bids from the one or more contributors, wherein a bid is associated with a contributor and comprises an offer to draft an article based on the first work request;
selecting a first bid; and
assigning the first work request to a first contributor associated with the first bid.

17. The one or more non-transitory computer-readable media storing instructions of claim 16, wherein the one or more keyword query parameters comprise at least one of:
one or more comparison website parameters, wherein a comparison website is a website different from the target website;
a search type parameter; and a search intent parameter, indicating a type of information a consumer intends to learn when searching for a keyword.

18. The one or more non-transitory computer-readable media storing instructions of claim 17, wherein the result of the first keyword query further comprise:
a second rank, wherein the second rank indicates how highly a comparison website is displayed in a search engine results page for the keyword.

19. The one or more non-transitory computer-readable media storing instructions of claim 16, wherein a contributor is associated with at least one contributor keyword based on:
identifying, based on one or more articles by the contributor, one or more contributor keywords associated with the one or more articles.

20. The one or more non-transitory computer-readable media storing instructions of claim 16, wherein a result further comprises:
a search frequency, wherein the search frequency of the keyword is further based on a number of times that the keyword was searched over a given period of time.

\* \* \* \* \*